(12) United States Patent
Jeanjean et al.

(10) Patent No.: US 7,371,064 B2
(45) Date of Patent: May 13, 2008

(54) HYDRAULIC DEVICE FOR BACK AND FORTH MOVEMENT OF A MACHINE PART, AND A CLAMPING UNIT OF AN INJECTION MOLDING MACHINE FITTED WITH SUCH A HYDRAULIC DEVICE

(75) Inventors: Gilbert Jeanjean, Oyonnax (FR); Jean-François Guyon, Groissiat (FR)

(73) Assignee: Billion S.A., Bellignat (FR)

( * ) Notice: Subject to any disclaimer, the term of this patent is extended or adjusted under 35 U.S.C. 154(b) by 128 days.

(21) Appl. No.: 10/510,115

(22) PCT Filed: Apr. 4, 2003

(86) PCT No.: PCT/EP03/03555

§ 371 (c)(1),
(2), (4) Date: Nov. 30, 2004

(87) PCT Pub. No.: WO03/084733

PCT Pub. Date: Oct. 16, 2003

(65) Prior Publication Data

US 2005/0129805 A1 Jun. 16, 2005

(30) Foreign Application Priority Data

Apr. 5, 2002 (DE) ................................ 102 15 072

(51) Int. Cl.
*B29C 45/67* (2006.01)
(52) U.S. Cl. ..................... 425/590; 425/589; 425/595
(58) Field of Classification Search ................ 425/589, 425/590, 591, 595, 574, 575; *B29C 45/67*
See application file for complete search history.

(56) References Cited

U.S. PATENT DOCUMENTS 4,325,287 A * 4/1982 Hehl ............................ 91/422
4,443,179 A * 4/1984 Wohlrab ...................... 425/590

(Continued)

FOREIGN PATENT DOCUMENTS

DE          66 05 115          4/1970

(Continued)

*Primary Examiner*—Yogendra N. Gupta
*Assistant Examiner*—Maria Veronica Ewald
(74) *Attorney, Agent, or Firm*—Henry M. Feiereisen; Ursula B. Day

(57) ABSTRACT

The invention relates to a hydraulic device for the back and forth movement and locking of a machine part, in particular for the opening, closing and locking of an injection molding tool. The hydraulic device comprises a cylinder (1), in which a first pressure space (6) is provided, a primary piston (2) with one or several piston rods (11) which may float in a pressure medium within the first pressure space (6) and furthermore an secondary piston (7) which may be axially displaced within the cylinder (1). The invention is characterized in that the auxiliary piston (7) comprises recesses (12), into which the piston rods (11) of the primary piston (2) can be moved and the opposing sides of the primary piston (2) and secondary piston (7) have surfaces (40, 41) which may be brought into contact. In a first movement phase (opening and closing) only the primary piston (2) is moved. In a second phase, when the surfaces (40) and (41) are in contact, the primary piston (2) and the secondary piston (7) move as a unit (locking).

28 Claims, 16 Drawing Sheets

U.S. PATENT DOCUMENTS 5,129,806 A * 7/1992 Hehl .......................... 425/135
5,547,366 A * 8/1996 Hehl .......................... 425/589

FOREIGN PATENT DOCUMENTS

| | | |
|---|---|---|
| DE | 18 05 938 | 7/1970 |
| DE | 85 33 535 U | 1/1986 |
| DE | 90 13 791.4 | 1/1991 |
| DE | 90 14 885.1 | 3/1991 |
| DE | 197 58 159 C2 | 8/1998 |
| EP | 0 281 330 A | 9/1988 |
| EP | 0 342 235 A | 11/1989 |
| FR | 2 739 149 | 3/1997 |

* cited by examiner

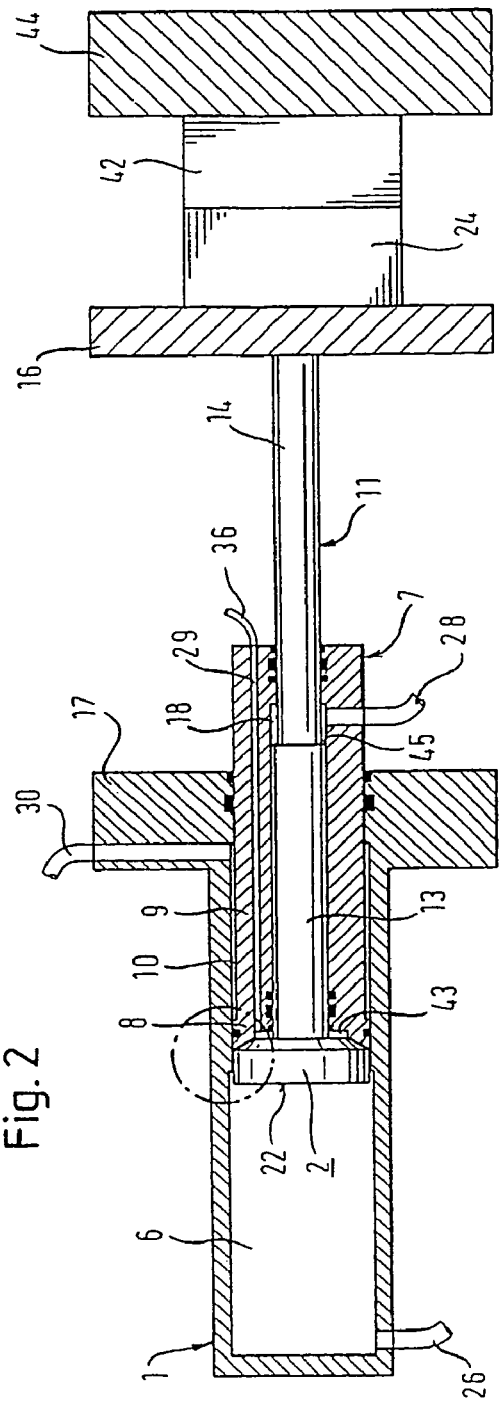
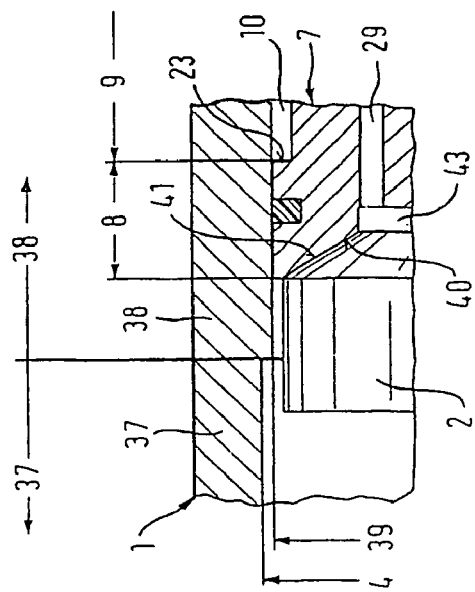
Fig. 2
Fig. 3

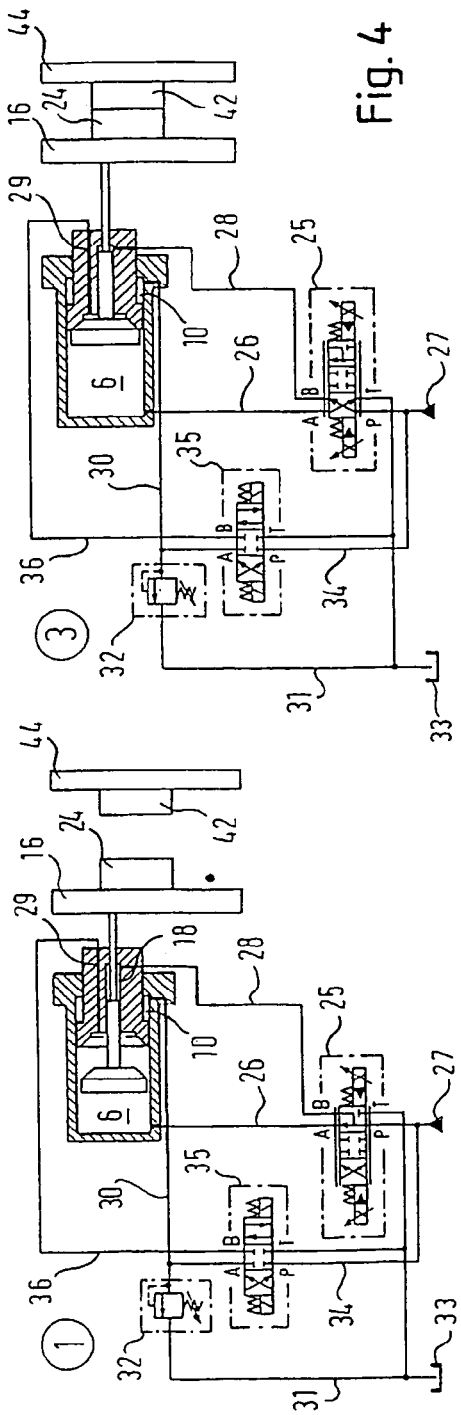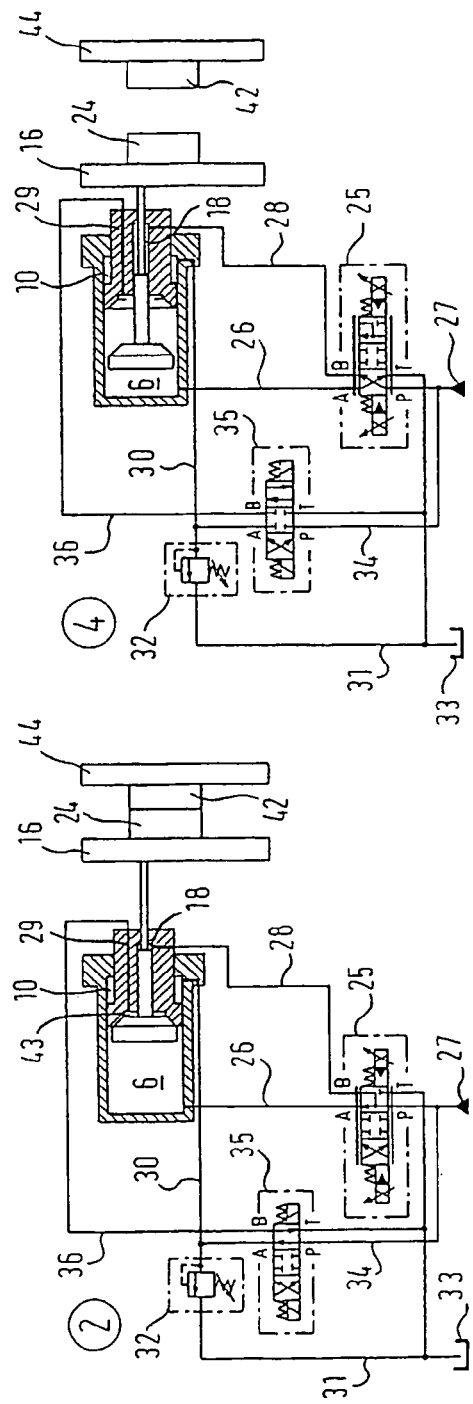
Fig. 4

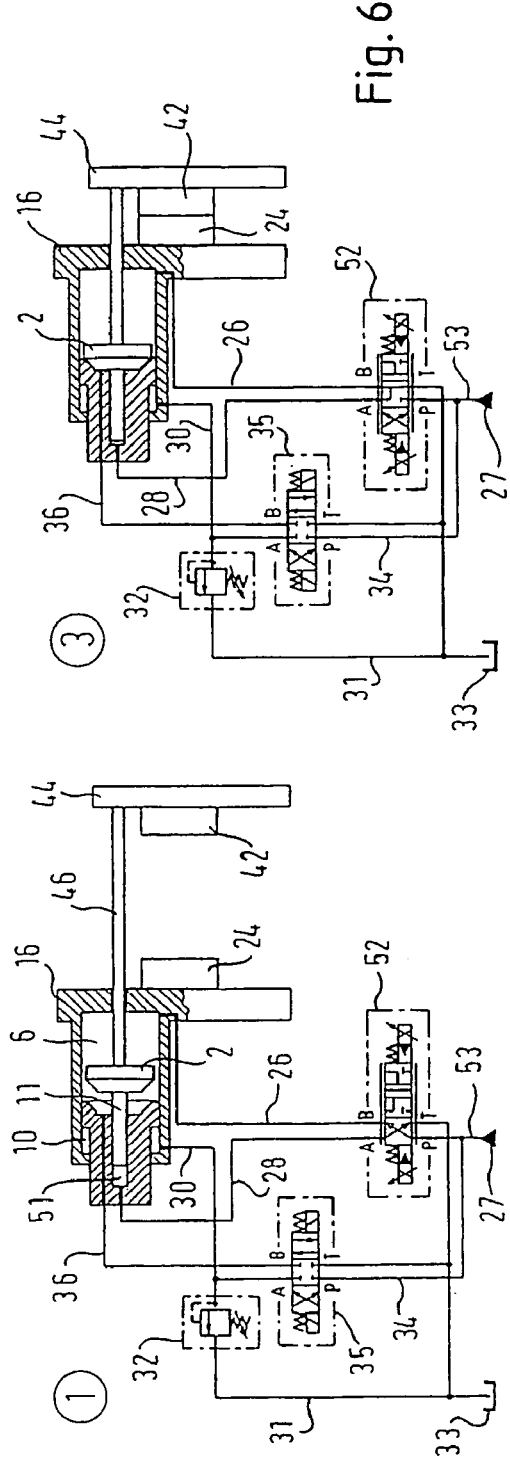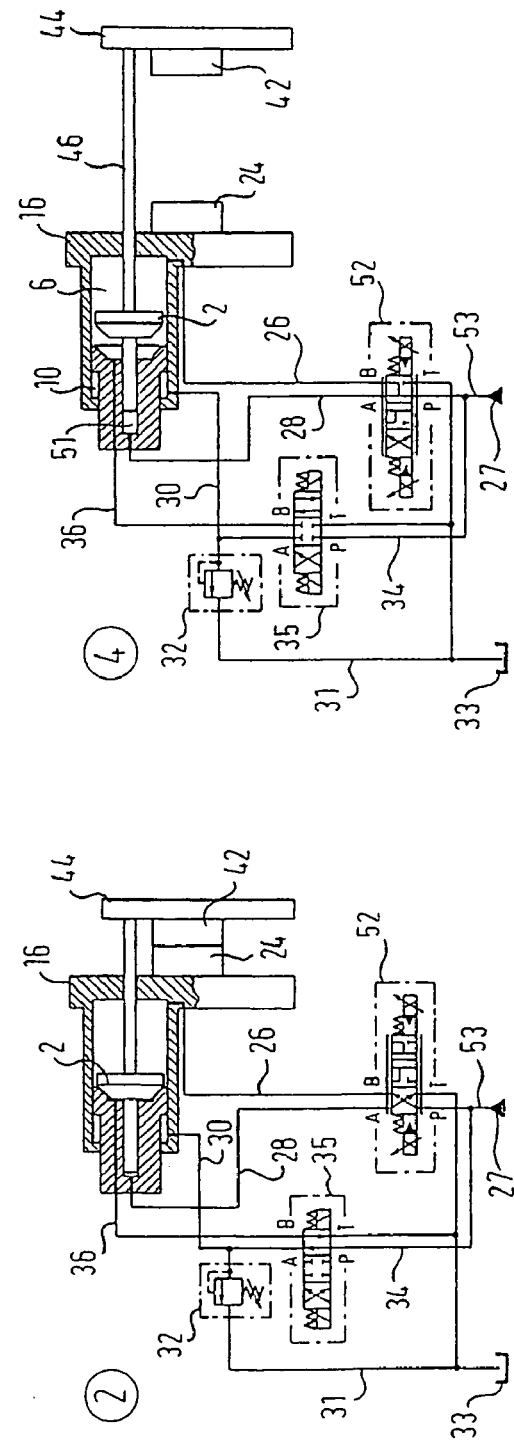
Fig. 6

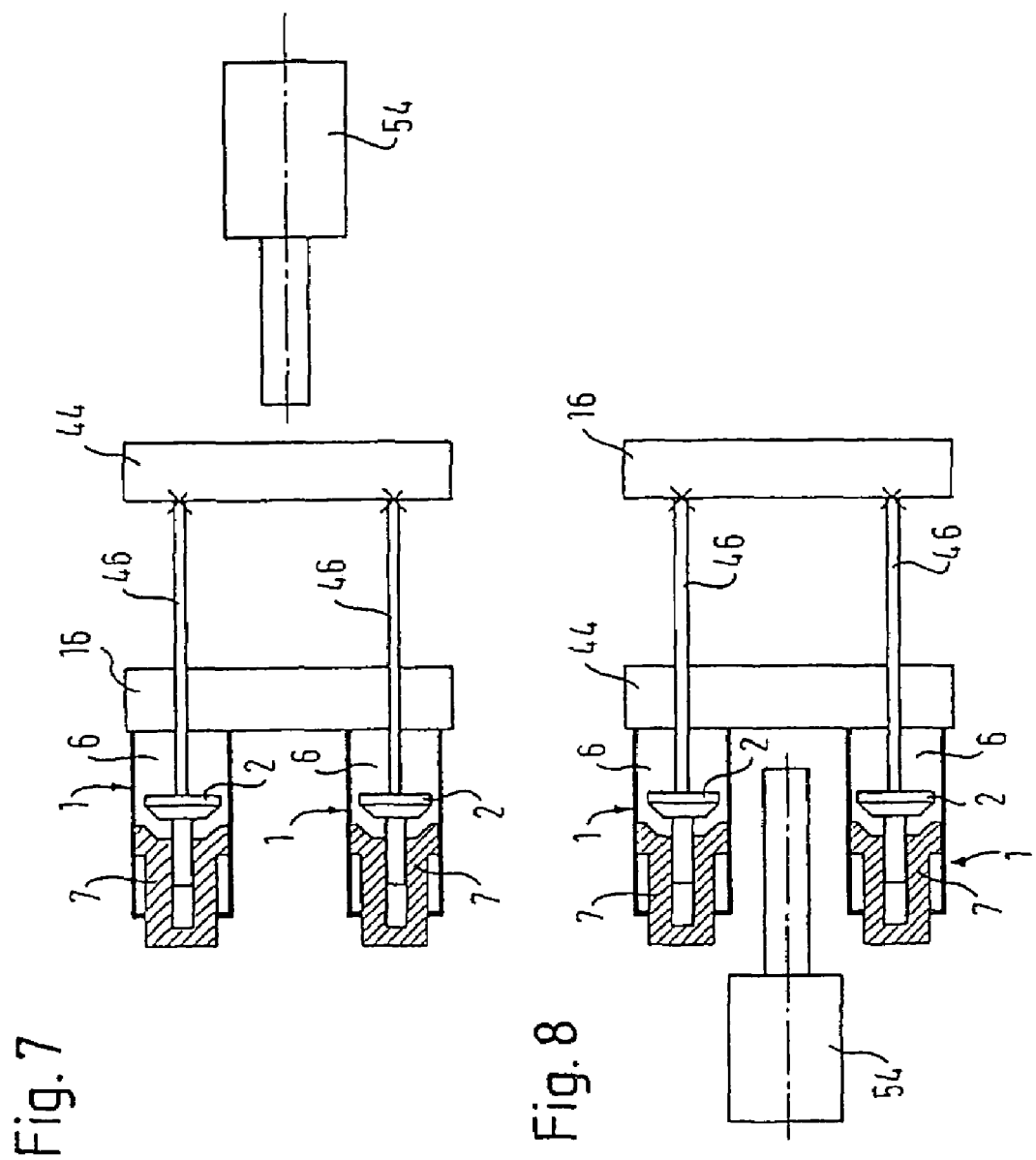

HYDRAULIC DEVICE FOR BACK AND FORTH MOVEMENT OF A MACHINE PART, AND A CLAMPING UNIT OF AN INJECTION MOLDING MACHINE FITTED WITH SUCH A HYDRAULIC DEVICE

BACKGROUND OF THE INVENTION

The invention relates to a hydraulic device for back and forth movement of a machine part according to the preamble of claim 1. The invention further relates to a clamping unit of an injection molding machine fitted with such a hydraulic device.

Various embodiments of conventional hydraulic devices are known that have a functional separation which is so configured that, on one hand, closing and opening takes place with little force and at high speed, and, on the other hand, the final approach and locking of the half-molds of the injection molding tool takes place with great force and at slight speed.

DE 6605115 U1 discloses the arrangement of a first piston as high-speed piston, provided on one end of a piston rod and sized of comparably small diameter, and of a second piston as working piston, provided on the other end of the piston rod and sized with comparably significantly greater diameter, whereby each of the pistons is guided in separate cylinders. In this way, a small area of the high-speed piston can be acted upon by pressure medium, and a significantly greater area of the working piston can be acted upon by pressure medium.

The documents DE 9013791 U1 and FR 2739149 disclose a guidance of the working piston in a working cylinder and an arrangement of the high-speed cylinder inside the piston rod of the working cylinder. In order to generate a greatest possible clamping force, DE 9013791 describes to size the effective area of the working piston large enough, whereas FR 2739149 describes to pressurize the chamber for the working piston as well as the chamber for the high-speed piston in a suitable manner so that the effective area of the high-speed piston participates in the development of the locking force.

Further known are hydraulic devices (DE 9014885 U1, DE 1805938 A1), in which the piston rods and the cylinders of high-speed piston, on one hand, and working piston, on the other hand, move within one another, whereby the high-speed piston and the working piston can be hydraulically locked together for building up the clamping force and for locking, while the machine part is locked by subjecting only the working piston to pressure medium.

DE 8533535 U1 discloses a hydraulic device for back and forth movement as well as locking of a machine part, in particular for opening, closing and clamping the half-molds of an injection molding tool of an injection molding machine. Provided in a cylinder is a first, large pressure space with a pressure medium in which a primary piston is axially movable having several piston rods that are coupled to the machine part to be moved. The primary piston includes several openings for allowing the pressure medium to flow from one side of the primary piston to the other side so that the primary piston is able to float in the pressure medium. Disposed in the primary piston for axial movement therein is a small lockable secondary piston for operating a flap valve to clear or close the openings in the primary piston. When closed, floating of the primary piston is prevented.

This known apparatus operates essentially as follows:
The areas subject to the pressure medium are so suited to one another that the primary piston is floatingly pushed to the right, when the flap valve is open and pressure medium is fed to the pressure space, and the tool of the injection molding machine is closed. Only little pressure medium is required and the movement is executed at great speed but with little force. The half-molds of the injection molding tool are clamped together by actuating the small secondary piston, disposed in the primary piston, to operate the flap valve and to inhibit the floating of the primary piston. As a consequence, pressure builds up only on the side of the primary piston, distal to the piston rods, as the injection molding tool travels a final distance at slight speed but great force and is subsequently clamped. The injection molding tool is opened by supplying pressure medium to the auxiliary cylinders, which accommodate the piston rods of the primary piston, and the flap valve is opened. The primary piston can now move floatingly to the left, and the injection molding tool opens.

A drawback of this apparatus is the relative complexity by which the secondary piston is disposed inside the primary piston for operating the flap valve, and the fact that the hydraulic lines for operating the secondary piston must be so routed through the cylinder and connected to the pressure space of the secondary piston inside the primary piston as to follow the back and forth movement of the primary piston in the primary cylinder. A further drawback is the need for separate auxiliary cylinders provided for the piston rods of the primary piston and mounted to the primary cylinder, as well as the provision of a further auxiliary cylinder in midsection for a compensating piston so that the hydraulic device is overall significantly longer than the length of the primary cylinder.

SUMMARY OF THE INVENTION

The invention is thus based on the object to provide a hydraulic device of this type, which uses only a single cylinder and thus is significantly shorter in size. Furthermore, the invention is based on the object to provide a clamping unit of an injection molding machine which is of shorter construction in relation to the state of art and requires comparably little pressure medium for realizing a back and forth movement of the moving platen.

The main advantage of the invention is the availability of the primary piston for back and forth movement of the machine part at great speed and with little force while requiring little pressure medium as well as for locking the machine part at slight speed and with great force, with all movement phases requiring only a (primary) cylinder, so that the hydraulic device is of short structure.

The configurations (for a three-platen clamping unit) as well as (for a two-platen clamping unit) have the particular advantage that only very little oil is required for closing and opening the half-molds as the large pressure space is blocked hydraulically and small movements of the secondary piston necessarily translate in great distances of the primary piston. The auxiliary cylinder may Wso be idle for the closing movement because its services are required only for opening. This results in an additional reduction in oil consumption. The auxiliary cylinder is thus required only for opening and may also be installed such that the large auxiliary pressure space for opening is supplied with pressure medium to provide a greater area which is acted upon by pressure medium. Therefore, a greater force is made available which is advantageous, when the beginning of the opening phase is concerned. A further advantage of this variation is the possibility to precisely control the slowdown of the platen toward the end of the clamping movement, thereby allowing a slowdown at the "last moment".

BRIEF DESCRIPTION OF THE DRAWING

Exemplary embodiments of the invention will now be described in more detail with reference to the FIGS. 1 to 18, in which:

FIG. 2 is a longitudinal section according to FIG. 1 with closed mold;

FIG. 3 is an enlarged illustration of a detail of FIG. 2;

FIG. 4 is a connection diagram of the first embodiment of the hydraulic device for various phases of the injection molding cycle:
  (1) closing of the half-molds
  (2) locking of the half-molds
  (3) release of the half-molds
  (4) opening of the half-molds

FIG. 6 is a connection diagram of the second embodiment of the hydraulic device for various phases of the injection molding cycle:
  (1) closing of the half-molds
  (2) locking of the half-molds
  (3) release of the half-molds
  (4) opening of the half-molds FIG. 7 is a schematic illustration of the use of a hydraulic device according to the second embodiment for a two-platen clamping unit with securement of the piston rods upon the fixed platen and securement of the cylinders upon the moving platen;

FIG. 8 is a schematic illustration of the use of a hydraulic device according to the second embodiment for a two-platen clamping unit with securement of the piston rods upon the moving platen and securement of the cylinders upon the fixed platen;

FIG. 9 closing of the half-molds
  FIG. 10 locking of the half-molds
  FIG. 11 release of the half-molds
  FIG. 12 opening of the half-molds

FIG. 14 closing of the half-molds
  FIG. 15 locking
  FIG. 16 release
  FIG. 17 opening of the half-molds

DETAILED DESCRIPTION OF PREFERRED EMBODIMENTS

First Exemplary Embodiment (FIGS. 1-4)

Figure 1:
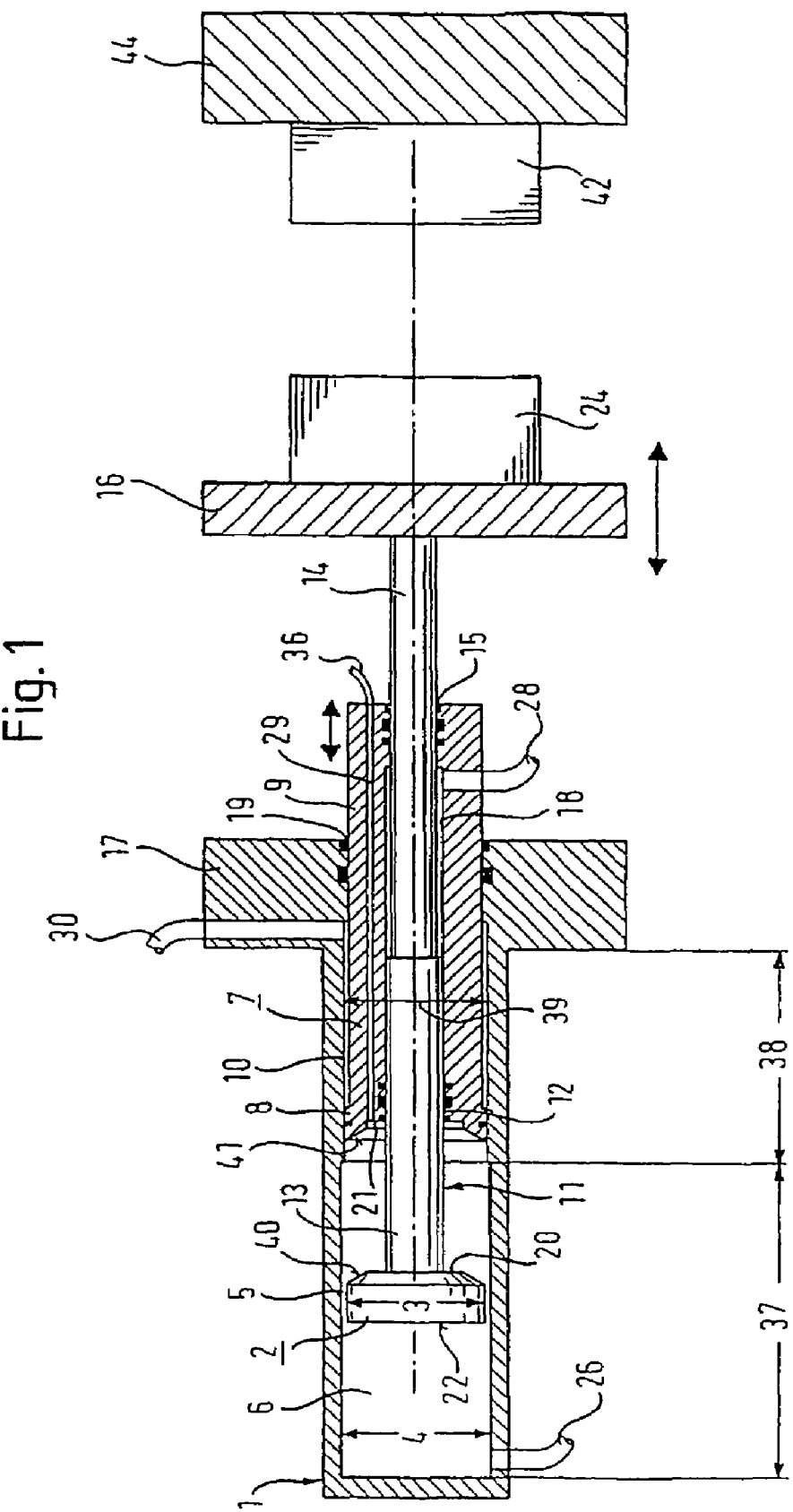
FIG. 1 is a longitudinal section of a first embodiment of the hydraulic device in combination with a three-platen clamping unit of an injection molding machine, when the mold is open.
Figure 5:
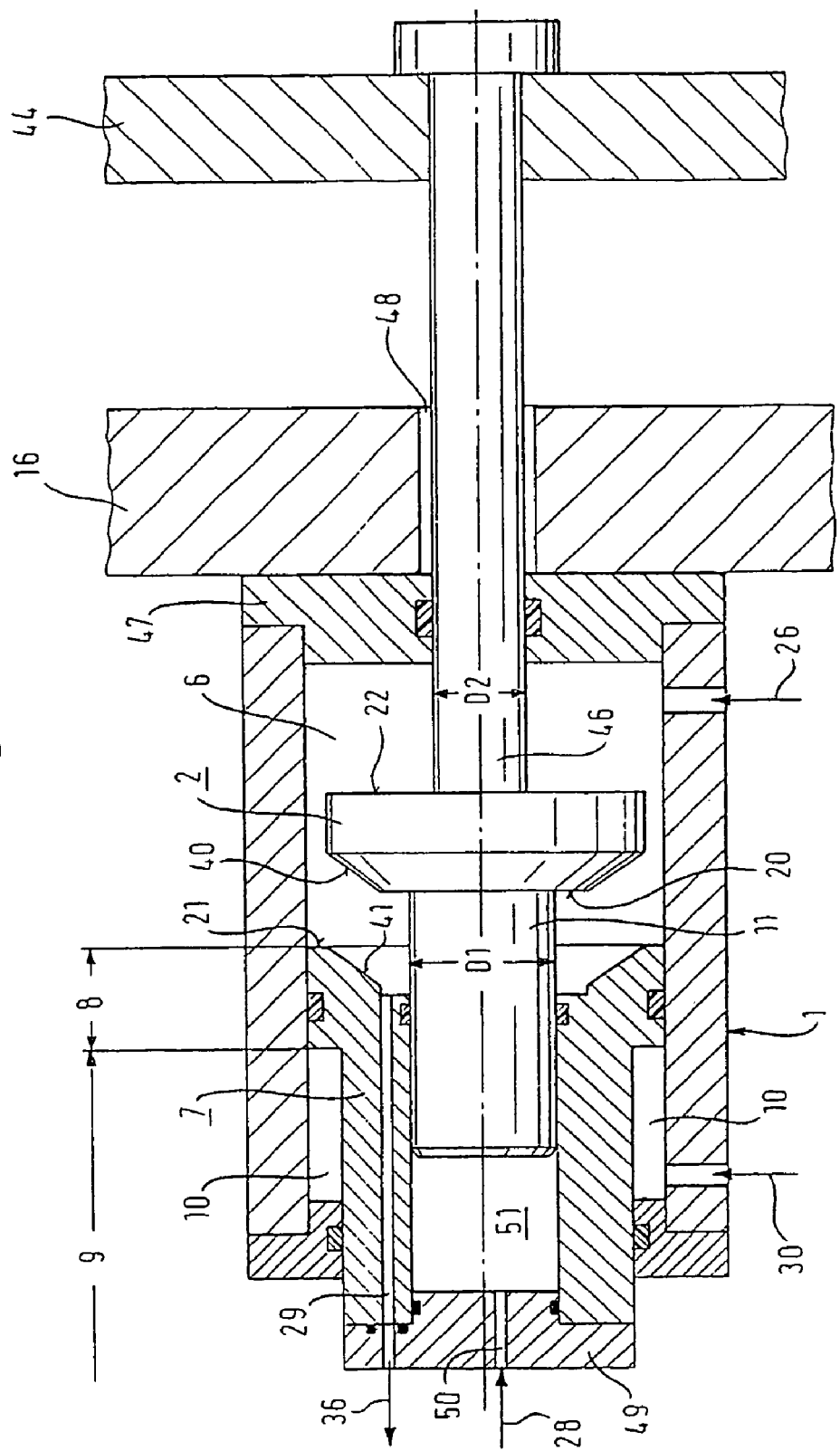
FIG. 5 is a longitudinal section of a second embodiment of the hydraulic device in combination with a two-platen clamping unit of an injection molding machine, when the mold is open.

A first embodiment of the hydraulic device according to the invention will now be described with reference to the use of such a hydraulic device for a clamping unit of a three-platen injection molding machine (see FIGS. 1 to 4).

A cylinder 1 has a first section 37 with a first inner diameter 4, and a second section 38 with a second inner diameter 39. Provided in the cylinder 1 is a pressure space 6 which communicates with a line 26 for a pressure medium and in which a primary piston 2 is axially movable. In the following description, lines provided for transport of a pressure medium are designated as pressure line or generally as line for the sake of simplicity. The diameter 3 of the primary piston 2 is significantly smaller than the inner diameter 4 and moreover smaller than the second inner diameter 39 of the cylinder 1 so as to form an annular gap 5. This enables a flow of pressure medium, preferably hydraulic oil, from the front side 22 of the primary piston 2 to the rear side 20 and back so that the primary piston 2 floats in the hydraulic oil. Furthermore, the second section 38 accommodates an axially movable and lockable secondary piston 7 having two sections 8 and 9.

The diameter of the first section 8 corresponds to the inner diameter 39 in the second section 38 of the cylinder 1 so that the secondary piston 7 is movable in this region in the cylinder 1. The division of the cylinder 1 in two sections 37 and 38 is done for cost saving reasons as only the section 38 is passed by the secondary piston 7 and requires a surface treatment to effect a hydraulically reliable tightness. The section 37 of the cylinder 1, on the other hand, does not necessitate any particular surface treatment. The diameter of the second section 9 of the secondary piston 7 is reduced in relation to the first section 8 so as to define a pressure space 10 in the shape of an annular gap between the secondary piston 7 and the cylinder 1 to the right of the circular ring shaped rear side 23 of the section 8 of the secondary piston 7 for communication with a pressure line 30. The second section 9 of the secondary piston 7 projects partially to the outside through an opening 19 in the right-hand wall 17 of the cylinder 1. The cylinder 1 is secured with its right-hand wall 17 to the rear side of the support platen of a three-platen clamping unit, or the support platen 17 itself forms the right-hand wall of the cylinder 1.

The piston rod 11 of the primary piston 2 has also two sections 13 and 14 of different diameters. The diameter of the first section 13 corresponds to the inner diameter of a cylindrical recess 12 in the secondary piston 7 so that the piston rod 11 is longitudinally movable in the secondary piston 7. The second section 14 has a smaller diameter than the section 13 and projects through a cylindrical bore 15 in the secondary piston 7 to the outside and is connected with the moving platen 16. As a result, a pressure space 18 in the shape of an annular gap is thus defined between the inner wall of the cylindrical recess 12 in the secondary piston 7 and the outer diameter of the section 14 of the piston rod 11 for connection to a pressure line 28.

When the primary piston 2 contacts the secondary piston 7, the contact surface 40 of the primary piston 2 touches the contact surface 41 of the secondary piston 7. The opposing sides 20 and 21 of primary and secondary pistons are furthermore so configured that a small pressure space 43 is formed between the primary piston 2 and the secondary piston 7, when the surfaces 40 and 41 abut one another, and can be decompressed via a passageway 29 in the secondary piston 7 and a pressure line 36. The primary piston 2 operates effectively as valve for closing the small pressure space 43.

The first embodiment of the hydraulic device has thus four pressure spaces:

1. A first, large pressure space 6 in which the primary piston 2 and the secondary piston 7 are longitudinally movable,
2. A second, only temporarily existing, pressure space 43 between the rear side 20 of the primary piston 2 and the front side 21 of the secondary piston 7,
3. A third annular gap shaped pressure space 10 between the outside of the secondary piston 7 and the cylinder 1,
4. A fourth annular gap shaped pressure space 18 between the outside of the section 14 of the piston rod 11 and the inner diameter of the cylindrical recess 12 in the secondary piston 7.

The mode of operation of the above-described hydraulic device will now be described with reference to the connection diagram of FIG. 4.

(1) Closing Movement (Closing of the Half-Molds)

The 4/3 directional control valve 35 occupies its center switching position so that the pressure line 30, feeding into the pressure space 10, and the pressure line 36, feeding into the passageway 36, are blocked. As a result, also the secondary piston 7 is hydraulically blocked and remains in its position. The 4/3 directional control valve 25 occupies its right switching position (differential mode). Hydraulic oil flows from the pressure medium source 27 via the pressure line 26 into the pressure space 6, and pressure is imposed on both sides 20 and 22 of the primary piston 2. As a result, a force is applied on the primary piston 2 to urge it to the right and is proportional to the diameter of the first section 13 of the piston rod 11. This force causes a movement of the primary piston 2 to the right. Hydraulic oil displaced hereby from the pressure space 18 is fed via the pressure line 28 and the 4/3 directional control valve 25 into the pressure line 26. The movement of the primary piston 2 is thus implemented at great speed while requiring only a small amount of hydraulic oil, despite the great distance traveled during this movement. The movement of the primary piston 2 causes the moving platen 16 to approach the fixed platen 44. Toward the end of this process, the rear side 20 of the primary piston 2 and the front side 21 of the secondary piston 7 directly oppose one another.

(2) Locking:

As soon as the contact surfaces 40 of the primary piston 2 and 41 of the secondary piston 7 touch one another and thereby form the pressure space 43, the 4/3 directional control valve 35 is switched over into the right switching position. Thus, the pressure space 43 communicates via the passageway 29 and the pressure line 36 with the tank 33 and can be decompressed. Hydraulic oil flows via the pressure lines 34 and 30 into the pressure space 10. The pressure space 10 as well as the pressure space 6 are thus supplied with hydraulic oil and set under pressure so that the secondary piston 7 and the primary piston 2 are firmly pressed with their contact surfaces 40 and 41 against one another in a hydraulically tight manner. In order to firmly press the surfaces 40 and 41 against one another—at same pressure in the pressure spaces 6 and 10—, the annular gap of the pressure space 10 must be greater at all times than the annular gap 5 plus the annular gap of the pressure space 18. The rear side 20 of the primary piston 2 is now no longer there so that the hydraulic oil in the pressure space 6 is effective only on the front side 22 of the primary piston 2 and the circular ring shaped section of the front side 21 of the secondary piston 7 that is not covered by the primary piston 2. As a result, a force is imposed on the unit of primary piston 2 and secondary piston 7 which force is proportional to the area acted upon in the pressure space 6 minus the circular ring shaped surfaces 23 of the pressure spaces 10 as well as 45 of the pressure space 18 which are both acted upon by hydraulic oil in opposite direction. For safety reasons a pressure relief valve 32 is provided and set to a level which slightly exceeds the locking pressure generated now in the pressure spaces 6 and 10. As a result, locking of the half-molds 24 and 42 requires only a very short travel distance while imposing a great force on the half-molds.

(3) Release:

As soon as an injection molded plastic article has sufficiently cooled down and can be removed from the mold 24, 42, the clamping unit is released. The 4/3 directional control valve 35 is switched to the center switching position to hydraulically block the pressure space 10. The 4/3 directional control valve 25 is switched over to the left switching position so that the pressure space 6 communicates via the pressure line 26 with the tank 33 and the pressure space 18 via the pressure line 28 with the pressure medium source 27. Thus, the pressure space 6 is decompressed so that the primary piston 2 can move to the left. As a result, also the pressure imposed on the secondary piston 7 eases so that the latter moves to the left by a small distance in correspondence to the expansion of the hydraulic oil trapped in the pressure space 10.

(4) Opening Movement (Opening of the Half-Molds)

In order to move the half-molds 24 and 42 apart, the pressure space 6 remains connected via the pressure line 26 with the tank 33 and thus is pressure-relieved. Hydraulic oil from the pressure medium source 27 is supplied to the pressure space 18 via the pressure line 28. As a consequence, the primary piston 2 and the piston rod 11 are moved to the left at great speed while the need for hydraulic oil is slight. In this way, the moving platen 16 is moved to the left away from the fixed plate 44.

Second Exemplary Embodiment (FIGS. 5-8)

A second embodiment of the hydraulic device according to the invention will now be described with reference to the use of such a hydraulic device for a clamping unit of a two-platen injection molding machine (see FIGS. 5 to 8). To avoid repetitions, the following description centers only on the essential differences. Same reference characters designate same components so that reference is made to the description of the first embodiment for understanding.

The cylinder 1 is secured with its right-hand wall 47 to the moving platen 16 of a two-platen injection molding machine of an injection molding machine. The primary piston 2 has on its rear side 20 a first piston rod 11 with a first diameter D1 and on its front side 22 a second piston rod 46 with a second diameter D2 which is smaller than D1. The second piston rod 46 projects beyond the right-hand wall 47 of the cylinder 1, is guided through a through opening 48, provided in the moving platen 16 and having a diameter which is greater than D2, and mounted to the fixed platen. The first piston rod 11 has a uniform diameter Dl which corresponds to the cylindrical recess in the secondary piston 7 so that the piston rod 11 can move in the secondary piston 7. The secondary piston 7 has on its left-hand end a wall 49 with a passageway 50 for allowing connection of a pressure line 28 in order to supply or drain hydraulic oil to or from the pressure space 51 in the secondary piston 7. This pressure space 51 corresponds in its function to the pressure space 18 of the first embodiment.

The mode of operation of this second embodiment will now be described with reference to the connection diagram of FIG. 6.

(1) Closing Movement (Closing of the Half-Molds)

The 4/3 directional control valve 35 occupies its center switching position so that the secondary piston 7 is hydraulically blocked. The 4/3 directional control valve 52 occupies its left switching position so that the pressure space 6 is supplied with hydraulic oil via the line 26. The pressure space 51 is connected to the tank 33. As a consequence of the smaller diameter D2 of the second piston rod 46, a force is imposed on the primary piston 2 to the left. As the piston rod is mounted to the fixed platen 44, the cylinder 1 with the secondary piston 7 is moved to the right toward the primary piston 2, and the half-molds 24 and 42 approach one another. Toward the end of this process, the rear side 20 of the primary piston 2 and the front side 21 of the secondary piston 7 oppose one another.

(2) Locking:

As soon as the contact surface 40 of the primary piston 2 and the contact surface 41 of the secondary piston 7 touch one another and thereby form the pressure space 43, the 4/3 directional control valve 35 is switched over into the right switching position. Thus, the pressure space 43 communicates via the passageway 29 and the pressure line 36 with the tank 33 and can be decompressed. Hydraulic oil flows via the pressure lines 53, 34 and 30 into the pressure space 10. The 4/3 directional control valve 52 remains in its left switching position so that the pressure space 6 is continuously supplied with hydraulic oil via the pressure lines 53 and 26. As the pressure space 10 as well as the pressure space 6 are now supplied with hydraulic oil and set under pressure, the secondary piston 7 and the primary piston 2 are firmly pressed with their contact surfaces 40 and 41 against one another in a hydraulically tight manner. The rear side 20 of the primary piston 2 is now no longer there so that the hydraulic oil in the pressure space 6 is effective only on the front side 22 of the primary piston 2 and the circular ring shaped section of the front side 21 of the secondary piston 7 that is not covered by the primary piston. As a result, the clamping unit is completely closed and locked in place while traveling a short distance and imposing a great force.

(3) Release:

As soon as an injection molded plastic article has sufficiently cooled down and can be removed from the mold 24, 42, the clamping unit can be released. The 4/3 directional control valve 35 is switched to the center switching position and the pressure space 10 is hydraulically blocked. The 4/3 directional control valve 52 is switched to the center switching position so that the pressure space 6 via the pressure line 26 and the pressure space 51 via the pressure line 28 communicate with the tank 33. Thus, the pressure space 6 and the pressure space 51 are decompressed.

(4) Opening Movement (Opening of the Half-Molds)

In order to move the half-molds 24 and 42 apart, the 4/3 directional control valve 52 is switched to the right switching position, and the pressure space 51 is filled in differential mode with hydraulic oil. As a consequence, the cylinder 1 and the secondary piston 7 are moved to the left because the primary piston 2 is mounted with its piston rod 46 to the fixed platen 44. This opening movement takes place at great speed but little need for hydraulic oil. In this way, the moving platen 16 is moved away from the fixed plate 44.

In the case of a two-platen clamping unit, the user has the freedom to choose on which of the platens the hydraulic device according to the invention should be mounted. According to a first option, as described above and shown schematically again in FIG. 7, the cylinder 1 can be mounted to the moving platen 16 and the primary piston 2 with its second piston rod 46 to the fixed platen 44. As an alternative, as shown schematically in FIG. 8, it is possible to mount the cylinder 1 to the fixed platen 44 and the primary piston 2 with its second piston rod 46 to the moving platen 16. In both cases, the injection unit 54 is typically associated to the fixed platen 44.

Third Exemplary Embodiment (FIGS. 9-13)

A third embodiment of the hydraulic device according to the invention will now be described with reference to FIGS. 9 to 12, and in a variation with reference to FIG. 13, in combination with a three-platen clamping unit of an injection molding machine. To avoid repetitions, the following description centers only on the essential differences to the first embodiment. Same reference characters designate same components so that reference is made to the description of the first embodiment for understanding.

One or—as shown here—two cylinders 1 are mounted to the support platen 17 of a three-platen clamping unit which further includes the moving platen 16 with a first half-mold 24 and the fixed platen 44 with a second half-mold 42. The support platen 17 has in the area of the cylinders 1 bores 55 through which the secondary pistons 7 of both cylinders 1 extend in freely movable manner. An auxiliary cylinder 56 is further mounted to the support platen 17 and has a piston rod 57 which is secured to the moving platen 16. In the present example, the auxiliary cylinder 56 is constructed as differential cylinder. Formed to the left of the piston 58 is a first auxiliary pressure space 59 and to the right of the piston 58 (on the side of the piston rod 57) is a second auxiliary pressure space 60. A first connection line 61 connects the first auxiliary pressure space 59 with the pressure line 30 which communicates with the pressure spaces 10. The second auxiliary pressure space 60 is connected via a second connection line 62 with the 4/3 directional control valve 63. Further provided are sensors 64 and 65 for detecting the contact between the contact surfaces 40 and 41. In the present example, microphones are involved which detect the acoustic signal generated during impact. Further provided is a position sensor 75 which is able to measure the position of the moving platen, for example to initiate a position-dependent change in the travel speed.

The mode of operation of this third embodiment will now be described with reference to the hydraulic connection diagrams of FIGS. 9 to 12.

Figure 9:
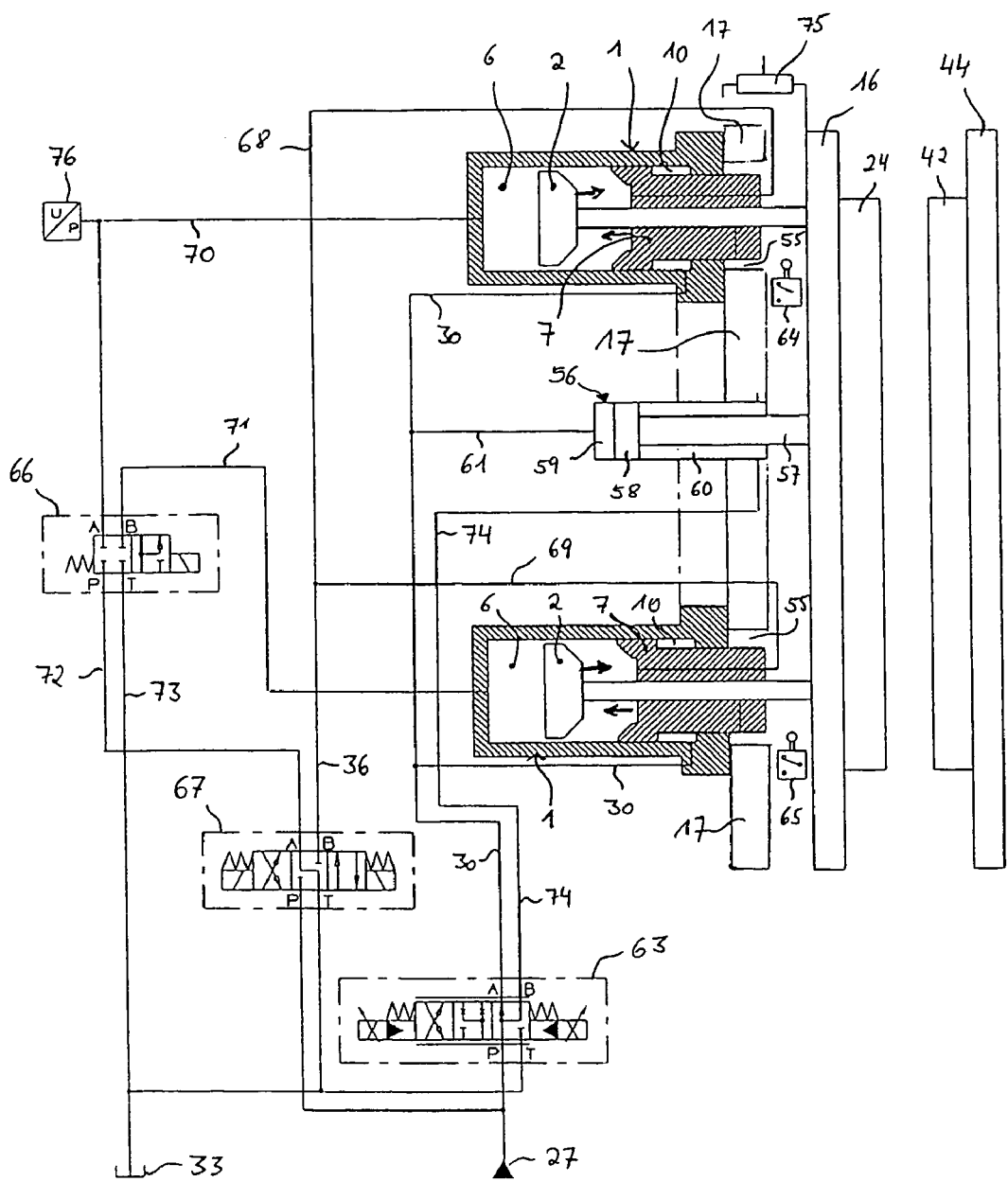
FIGS. 9-12 show a third embodiment of the hydraulic device for a three-platen clamping unit of an injection molding machine with connection diagram of the hydraulic device for various phases of the injection molding cycle.

(1) Closing Movement (Closing of the Half-Molds) According To FIG. 9

The 4/2 directional control valve 66 occupies its left switching position, and the pressure spaces 6 in both cylinders 1 are hydraulically blocked. The 4/3 directional control valve 63 occupies its right switching position and both pressure spaces 10 in the cylinders 1 are supplied with hydraulic oil from the pressure medium source 27. Furthermore, both auxiliary pressure spaces 59 and 60 are supplied with hydraulic oil, and the auxiliary pressure cylinder is operated in differential mode. The auxiliary pressure cylinder 56 drives the moving platen 16 to the right toward the fixed platen 44. In addition, a force is imposed by the piston rods 11 of the primary pistons 2 on the moving platen 16 and realized by the movement of the secondary pistons 7 to the left into the pressure spaces 6 under the action of hydraulic oil fed into the pressure spaces 10, while the volume in the pressure spaces 6 remains unchanged so that the piston rods 11 are pushed to the right out of the pressure spaces 6. As a result, the forces, generated by the piston rod 57 of the auxiliary cylinder 56 and the piston rods 11 of both cylinders 1 and imposed on the moving platen 16, add up. Toward the end of the closing movement, the rear side 20 of the primary piston 2 and the front side 21 of the secondary piston 7 in each of both cylinders 1 oppose one another.

Figure 10:
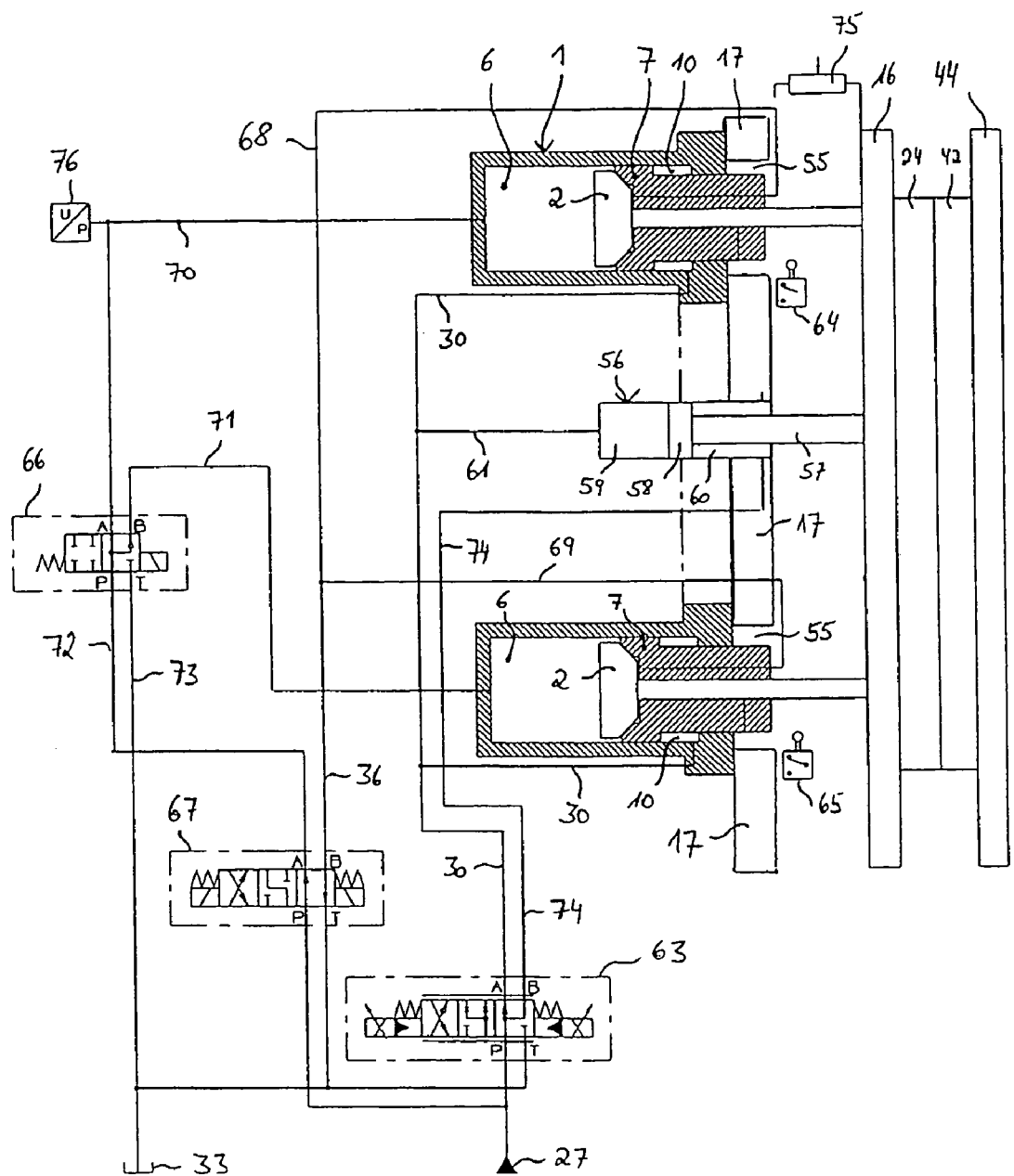

(2) Locking According to FIG. 10:

When the contact surfaces 40 and 41 of primary and secondary pistons impact one another, an acoustic signal is generated and detected by the microphones 64 and 65 and decompression of the pressure space 43, now developing between the primary piston 2 and the secondary piston 7, is initiated. The 4/3 directional control valve 67 is switched to the right switching position, so that each pressure space 43 communicates via the respective passageway 29, the connecting lines 68 and 69 as well as the pressure line 36 with the tank 33. A short moment later, the 4/2 directional control valve 66 is switched to the right switching position. The 4/3 directional control valve 67 remains unchanged, i.e. in its right switching position. In this way, hydraulic oil from the pressure medium source 27 is supplied via the pressure line 34, the connecting lines P-A in the right switching position of the 4/3 directional control valve 67, the pressure line 72 and the branch P-A, B in the right switching position of the 4/2 directional control valve 66 into the respective pressure space 6 of both cylinders 1, and both primary pistons 2 are pressurized. The primary piston 2 is pressed firmly against the secondary piston 7 and moved conjointly therewith to the right out of the cylinder 1. This locking action is assisted by the auxiliary cylinder 56 which is also supplied with hydraulic oil. A pressure sensor 76 measures the pressure generated in the pressure spaces 6 and the pressure can be increased or decreased through variation of the flow rate to suitably adjust the clamping force.

Figure 11:
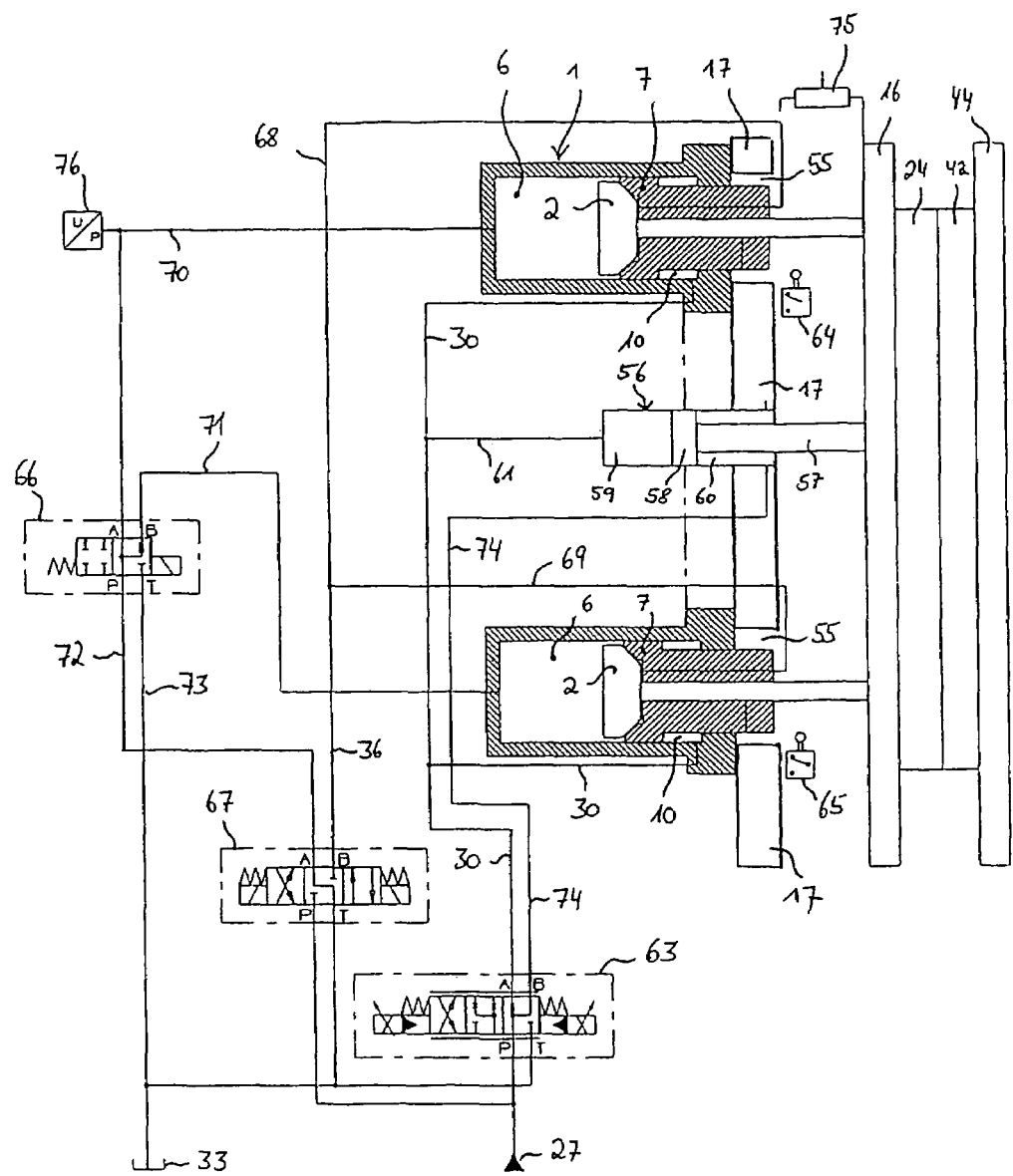

(3) Release according to FIG. 11:

A release is effected by switching the 4/3 directional control valve 67 to the center switching position so that each pressure space 6 communicates via the pressure lines 70, 71, the 4/2 directional control valve 66, the pressure space 72 and the 4/3 directional control valve 67 with the tank 33. The pressure spaces 10 as well as the auxiliary cylinder 56 are further supplied with hydraulic oil via the 4/3 directional control valve 63 and the pressure lines 30, 61 and 74. The half-molds 24 and 42 are still closed by a slight force. Thus, release may take place already during the cool-down phase in which the plastic article that has just been injection-molded needs only to be held in the mold.

Figure 12:
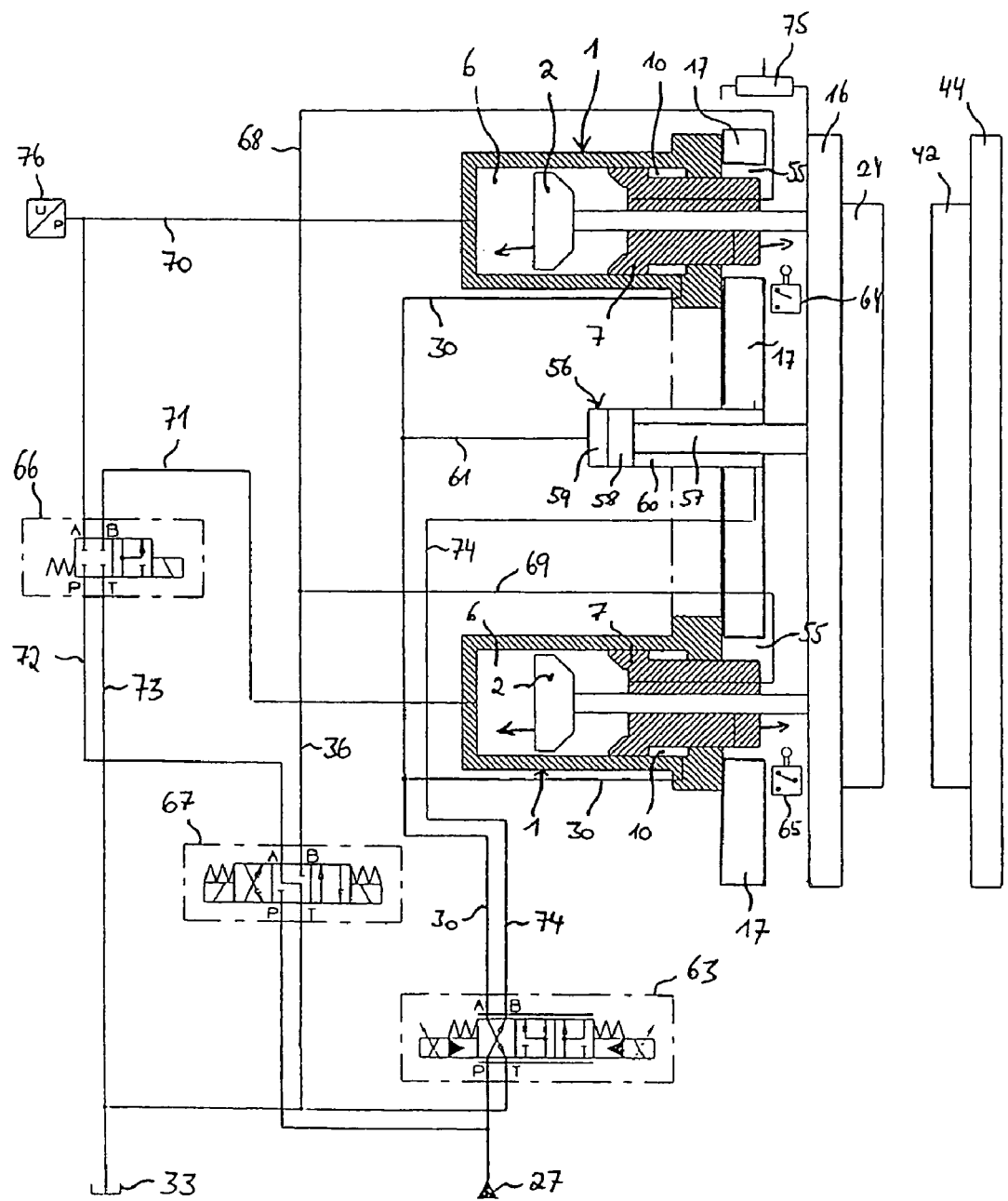

(4) Opening Movement (Opening of the Half-Molds) According to FIG. 12

When the finished plastic article has sufficiently cooled down and can be removed from the mold 24, 42, the half-molds 24 and 42 are moved apart. The 4/2 directional control valve 66 is switched to the left switching position in which the pressure space 6 in each of the cylinders 1 is hydraulically blocked. The 4/3 directional control valve 63 is switched to the left switching position in which A is connected with T and P with B so that the auxiliary pressure space 60 is supplied with hydraulic oil and the auxiliary pressure space 59 as well as both pressure spaces 10 are connected to the tank 33 and thus are pressure-relieved. The piston 58 of the auxiliary cylinder 56 is moved to the left and pulls the moving platen 16 away from the fixed platen 44. Thus, in the cylinders 1, the respective piston rod 11 of the primary piston 2 is pushed into the cylinder 1. As the pressure space 6 is hydraulically blocked, the secondary piston 7 is displaced automatically out of the cylinder 1 by such a distance that the volume in the pressure space 6 remains unchanged.

Figure 13:
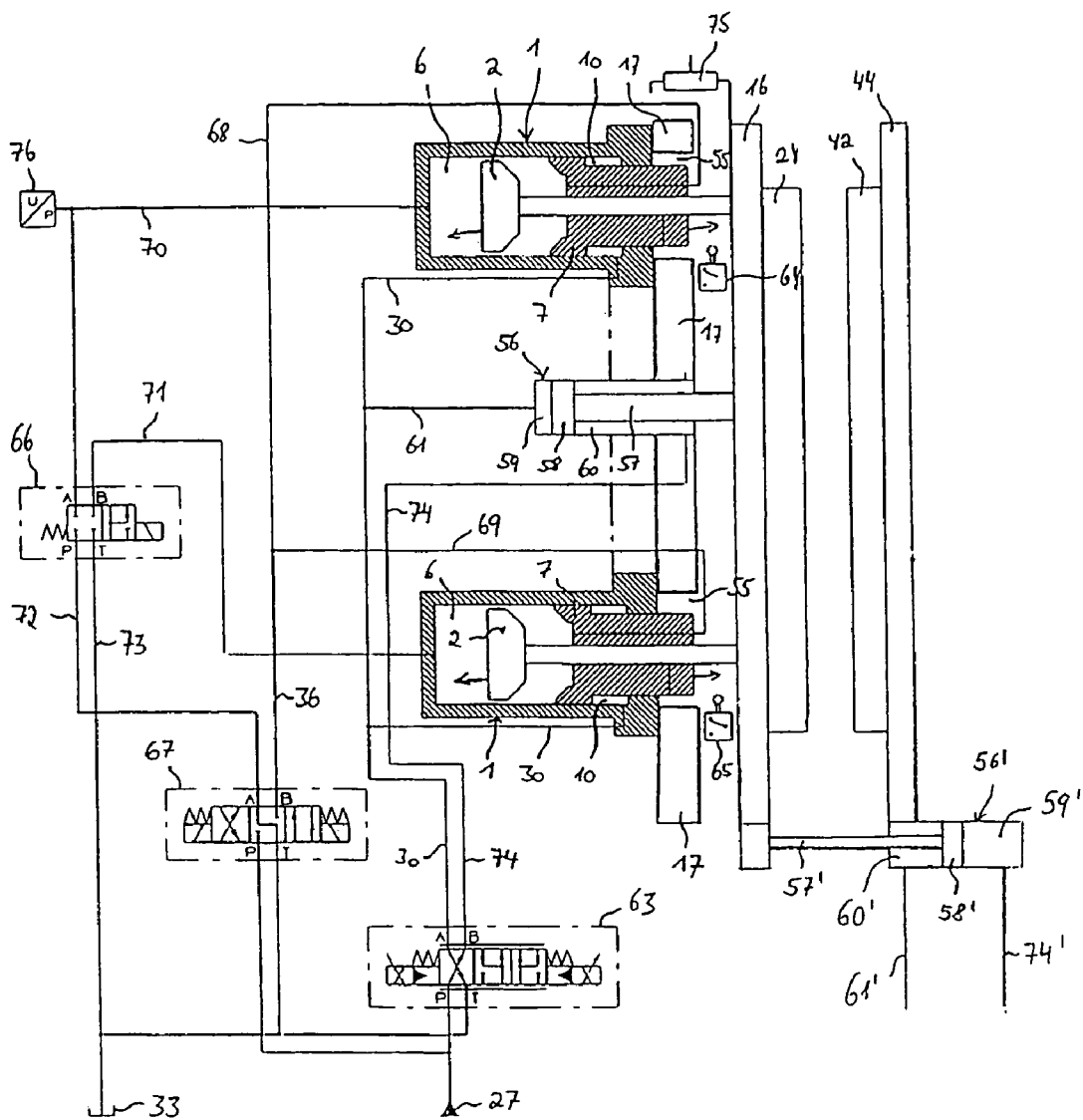
FIG. 13 is a modification of the third embodiment.

FIG. 13 illustrates a variation of the third exemplary embodiment. In addition to the auxiliary cylinder 56, which is mounted to the support platen 17, there may be provided on the fixed platen 44 a further auxiliary cylinder 56' having a piston rod 57' which is connected to the moving platen 16. This arrangement has the advantage that the greater surface of the piston 58' that is distal to the piston rod 57' can be subjected to hydraulic oil for the opening movement. Thus, a comparably great force is made available for the opening of the half-molds. This further auxiliary cylinder 56' is moreover hydraulically connected such as to be idle for the closing movement or that the smaller pressure space 60' is connected to the pressure medium source 27. By means of the pressure lines 61' and 74', the further auxiliary cylinder can be operated via a separate hydraulic circuit or suitably connected to the existing hydraulic circuit so as to be operable in the previously described manner.

Not shown in the variation of FIG. 13 is the provision of one or more auxiliary cylinder 56' on the fixed platen 44 only and of the hydraulic devices 1 according to the invention on the support platen 17 only.

Fourth Exemplary Embodiment (FIGS. 14-18)

A fourth embodiment of the hydraulic device according to the invention will now be described with reference to FIGS. 14 to 17 in combination with a two-platen clamping unit of an injection molding machine. To avoid repetitions, the following description centers only on the essential differences to the second embodiment. Same reference characters designate same components so that reference is made to the description of the first embodiment for understanding. According to the first variation (FIG. 14 to 17), the hydraulic device according to the invention and an auxiliary cylinder are mounted to the fixed platen. This variation is shown in FIGS. 14 to 17 by a hydraulic connection diagram for the various phases of the injection molding cycle. In the second variation (FIG. 18), the hydraulic device according to the invention is mounted to the moving platen and an auxiliary cylinder is mounted to the fixed platen. The hydraulic connection diagram depicts the situation in idle state.

According to claim 14, the cylinder 1 is mounted on the fixed platen 44, and the further piston rod 46 is guided through the fixed platen 44 and mounted to the moving platen 16. The recess 12 in the secondary cylinder 7 is open on its end distal to the primary piston 2 so that the piston rod 11 is movable without pressure in the recess 12. Furthermore, an auxiliary cylinder 56 is secured on the fixed platen 44 and has a piston rod 57 which is guided through the fixed platen 44 and mounted to the moving platen 16. A closing involves a connection of the smaller auxiliary pressure space 60 to the pressure medium source 27 whereas the greater auxiliary pressure 59 is connected to the pressure medium source 27 for the opening movement. Pressure sensors 76 measure and monitor the pressure in the pressure spaces 6 and 10. The actual position of the moving platen 16 can be measured by a position sensor 75 and evaluated by a machine control.

Figure 14:
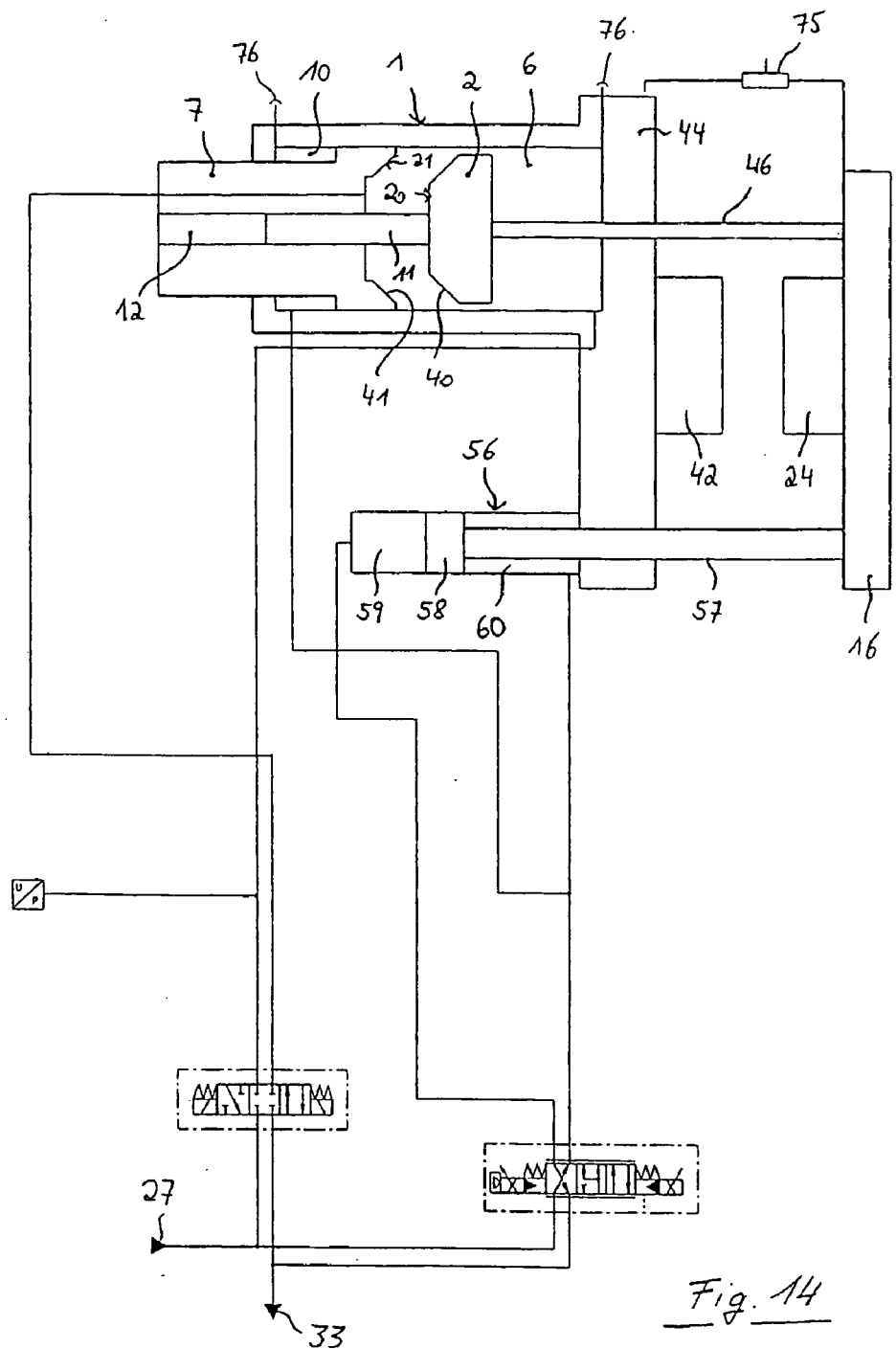
FIGS. 14-17 show a fourth embodiment of the hydraulic device for a two-platen clamping unit of an injection molding machine with the hydraulic device and an auxiliary cylinder on the fixed platen, with connection diagram of the hydraulic device for various phases of the injection molding cycle.

(1) Closing Movement (Closing of the Half-Molds) According to FIG. 14

Closing of the half-molds 24, 42 involves a hydraulic blocking of the pressure space 6 and connection of the third pressure chamber 10 to the pressure medium source 27. The auxiliary cylinder 56 can—as illustrated here—optionally added and also supplied with hydraulic oil by supplying hydraulic oil to the small auxiliary pressure space 60. As the volume in the pressure space 6 is constant, a movement of the secondary piston 7 to the right is accompanied in a same measure by a movement of the primary piston 2 to the left. The moving platen 16 is moved to the fixed platen 44. Toward the end of the closing movement, the rear side 20 of the primary piston 2 and the front side 21 of the secondary piston 7 oppose one another.

Figure 15:
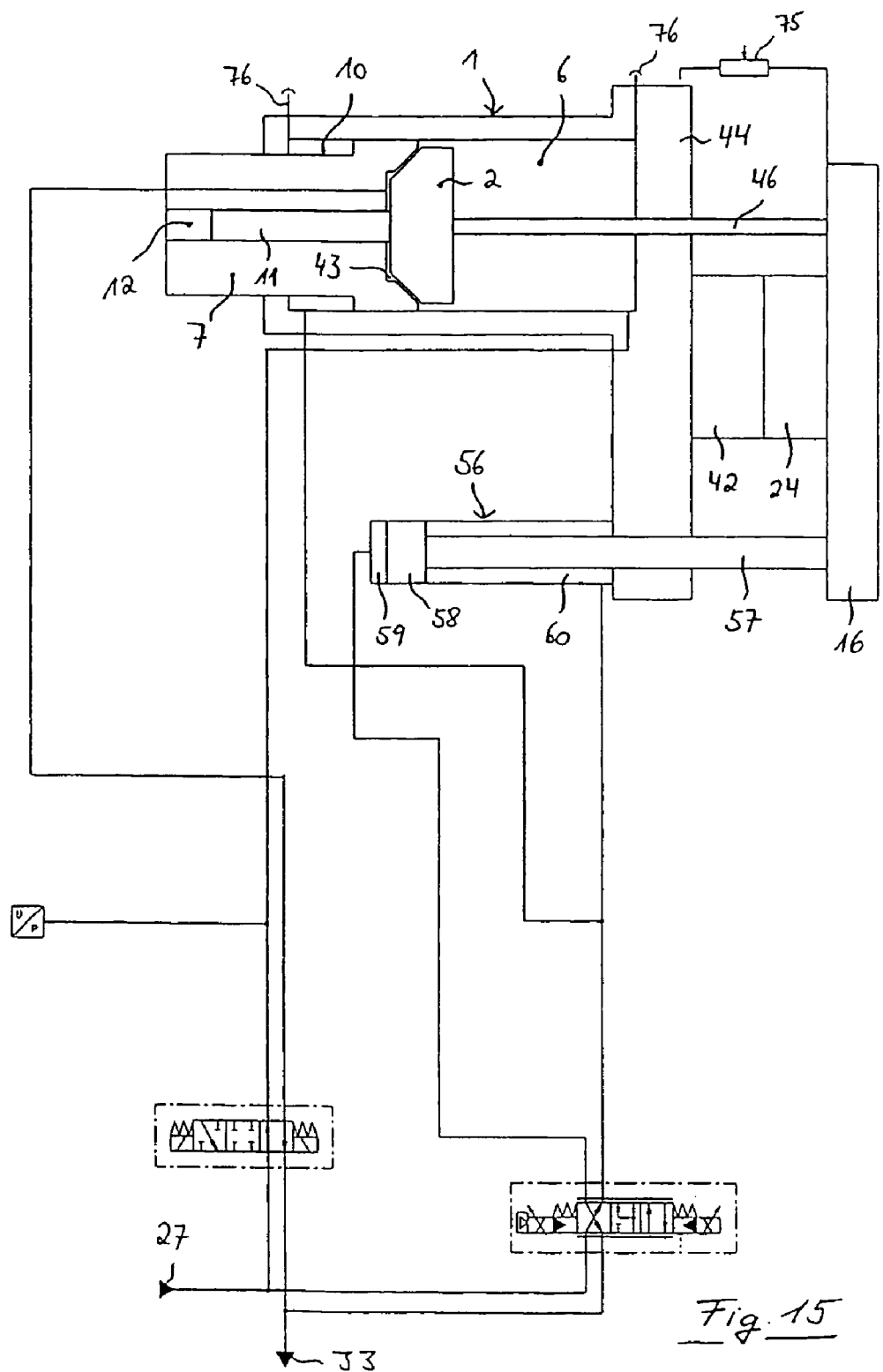

(2) Locking according to FIG. 15:

When the contact surfaces 40 and 41 of primary and secondary pistons impact one another, the acoustic signal generated hereby is detected and decompression of the pressure space 43, developing between the primary piston 2 and the secondary piston 7, is initiated. The primary piston 2 is now firmly pressed against the secondary piston 7. Supply of hydraulic oil to the pressure space 6 and also to the pressure space 10 moves the primary piston 2 and the secondary piston 7 as unit to the left out of the cylinder 1. Locking can —as shown here—optionally assisted by the auxiliary cylinder 56. A pressure sensor 76 measures the pressure in the pressure space 6, and the pressure can be increased or decreased through variation of the flow rate on the pressure medium source 27 in order to suitably adjust the claming force.

Figure 16:
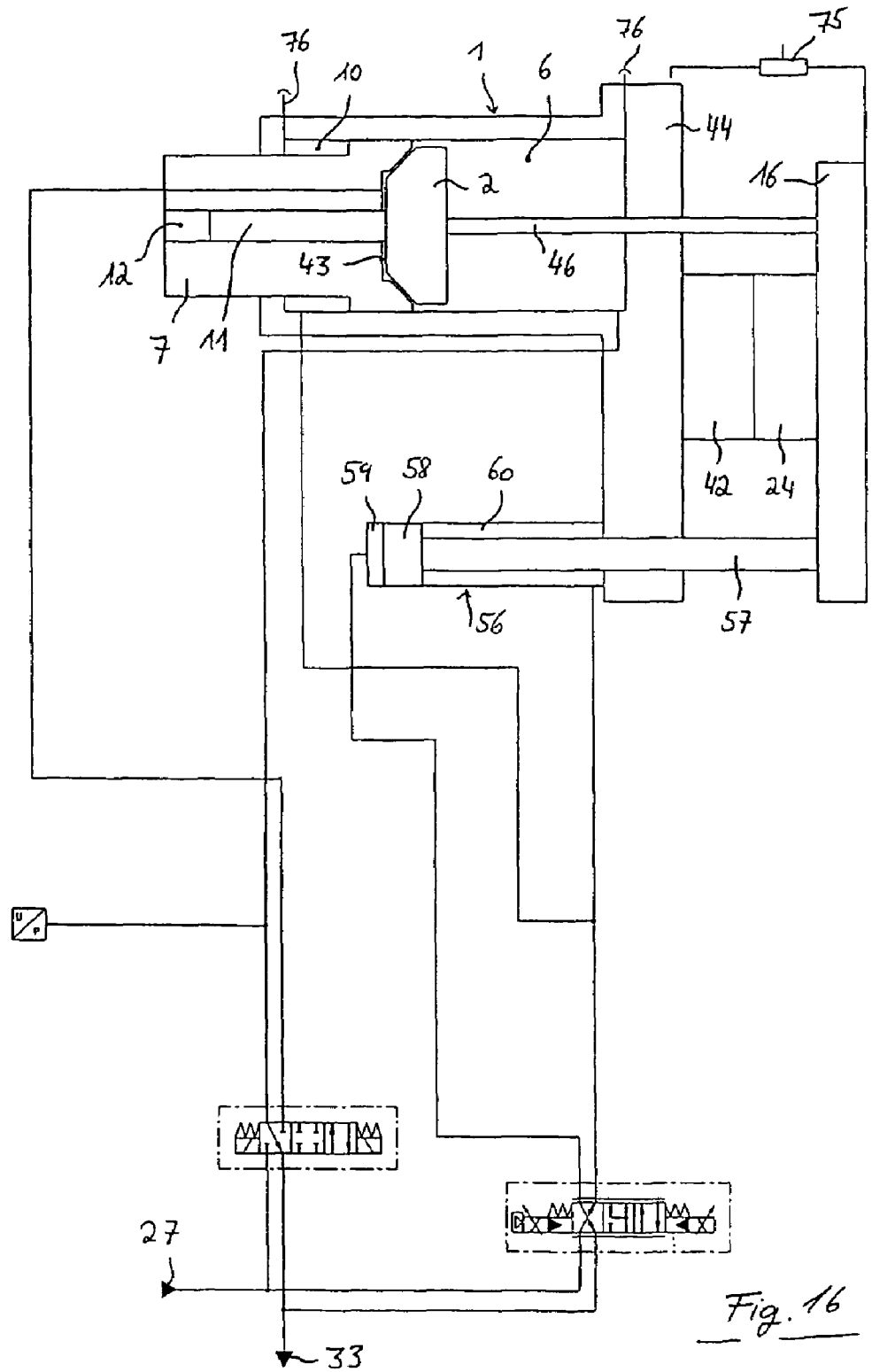

(3) Release According to FIG. 16

Release is realized by connecting the pressure space 6 to the tank 33 for pressure relief. When the auxiliary cylinder 56 is connected, the half-molds 24 and 42 remain closed by only a small force.

Figure 17:
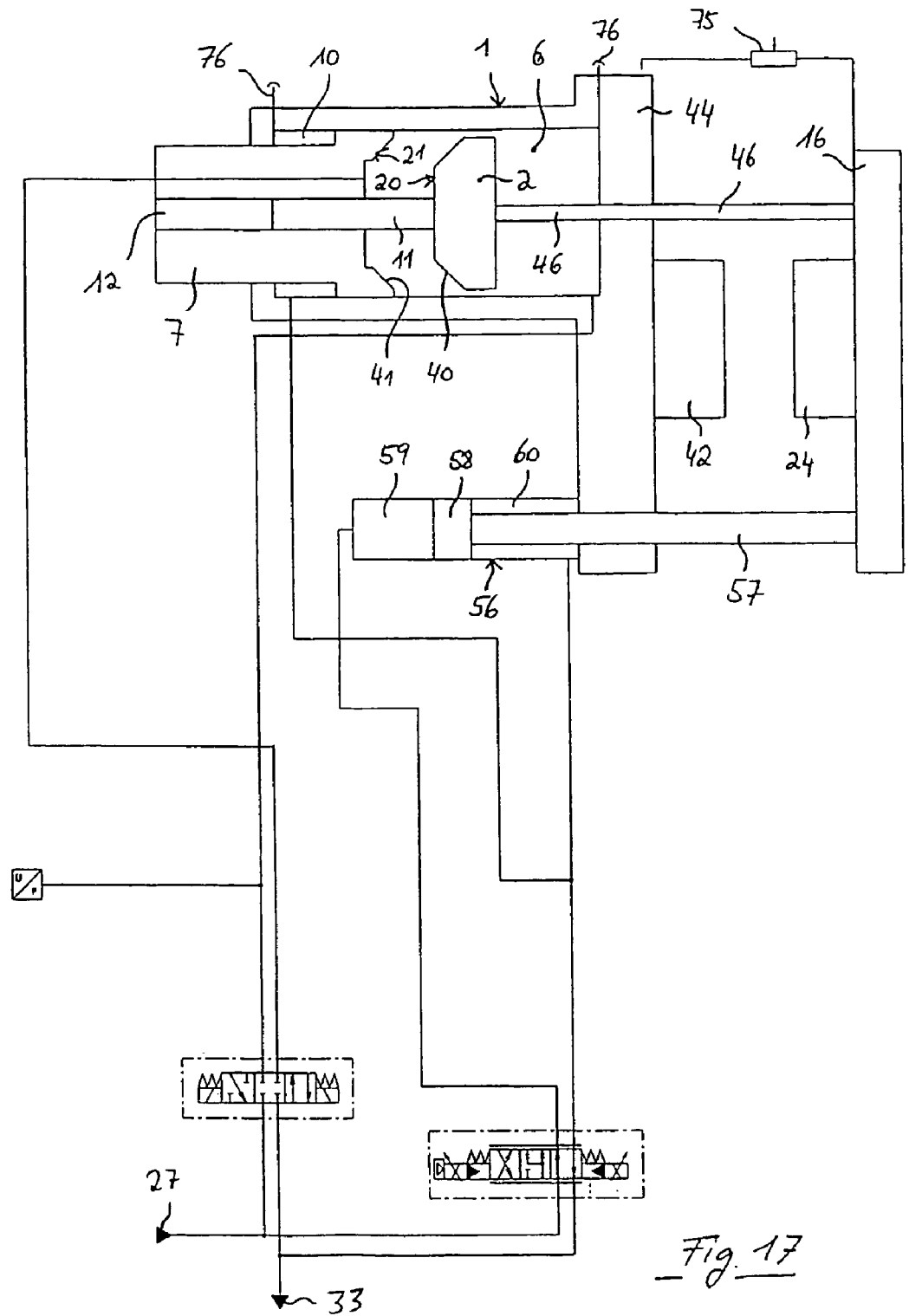

(4) Opening Movement (Opening of the Half-Molds) According to FIG. 17

When the finished plastic article has sufficiently cooled down and can be removed from the mold 24, 42, the half-molds 24 and 42 are moved apart. The pressure space 6 is hereby hydraulically blocked. The larger auxiliary pressure space 59 is supplied with hydraulic oil. The smaller auxiliary pressure space 60 and the pressure space 10 are connected to the tank 33. The piston 58 of the auxiliary cylinder 56 is moved to the right and the moving platen 16 is moved away from the fixed platen 44. At the same time, the piston rod 11 of the primary piston 2 in the cylinder 1 is pushed out of the secondary piston 7. As the pressure space 6 is hydraulically blocked, the secondary piston 7 is displaced automatically out of the cylinder 1 to the left by such a distance that the volume in the pressure space 6 remains unchanged.

Figure 18:
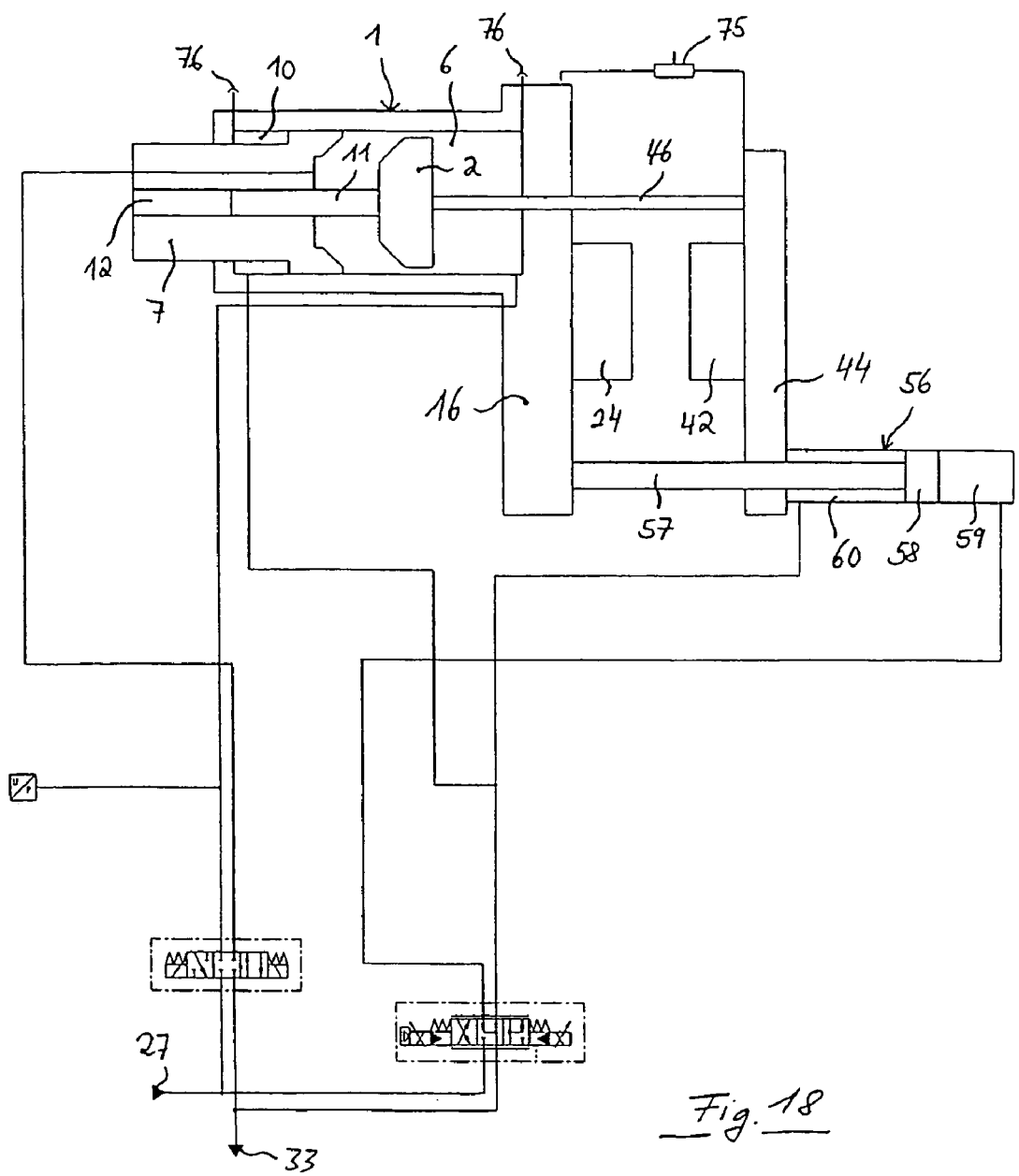
FIG. 18 shows the fourth embodiment of the hydraulic device for a two-platen clamping unit of an injection molding machine with the hydraulic device on the moving platen and an auxiliary cylinder on the fixed platen.

In the variation of the fourth embodiment according to FIG. 18, the auxiliary cylinder 56 is mounted, as previously, to the fixed platen 44 and has a piston rod 57 which is connected to the moving platen 16. The cylinder 1 of the hydraulic device according to the invention is, however, mounted to the moving platen 16, and the piston rod 46 is guided through the moving platen 16 and mounted to the fixed platen 44. The mode of operation is as described above, with the difference that the moving platen 16 is moved together with the cylinder 1 to the right in the direction of the fixed platen 44 or to the left away from it, whereas the primary piston 2 with both its piston rods 11 and 46 remains stationary. For sake of simplicity, the hydraulic diagram shows the clamping unit in idle state.

The exemplary embodiments three and four with the auxiliary cylinder have the advantage compared to the exemplary embodiments one and two without auxiliary cylinder that closing as well as opening of the half-molds requires only very little hydraulic oil. This is so because small movements of the secondary piston 7 result in comparably large volume changes in the pressure space 6 so that—as the pressure space 6 is blocked—the piston rod 11 of the primary piston 2 can be moved over great distances.

The clamping units according to FIGS. 9 to 18 can also be so operated that the auxiliary cylinder is supplied with hydraulic oil only for the opening movement and otherwise remains idle.

In all embodiments, the clearance height between the platens and thus the height of the mold is adjusted by expanding the pressure space 10 through inflow of hydraulic oil or by contracting the pressure space 10 through draining hydraulic oil. By the same token, also the volume in the pressure space 6 has to be adjusted. For this purpose, the half-molds 24, 42 are moved for impact, optionally in the presence of a small gap, and the primary piston 2 and the secondary piston 7 are brought into contact in this position. As a result, the volumes in the first pressure space 6 and the third pressure space 10 are defined. In the first two embodiments, the third pressure space 10 is blocked during the closing and opening movements. In contrast thereto, the first pressure space 6 is hydraulically blocked during the closing and opening movements in the third and fourth exemplary embodiments.

What is claimed is:

1. A hydraulic device for back and forth movement as well as locking of a machine part, in particular for opening, closing and clamping half-molds of an injection molding tool of an injection molding machine, comprising:

a cylinder having a first pressure space with a pressure medium:

a primary piston which includes one or more piston rods and is constructed to float in the pressure medium in the first pressure space, a one of the one or more piston rods being connected to a platen for a half-mold of an injection molding machine; and a secondary piston axially movable in the cylinder and sized to bound the first pressure space on one side thereof in any axial disposition thereof, said secondary piston having a recess in which one of the one or more piston rods of the primary piston is movable, said primary and secondary pistons having opposing sides to define confronting contact surfaces which contact one another when the half-molds are clamped.

2. The hydraulic device of claim 1, wherein the opposing sides of the primary and secondary pistons are so configured as to form a second pressure space, when the contact surfaces between the primary piston and secondary piston touch one another, and further comprising a passageway which feeds into the second pressure space and is provided for decompressing the pressure medium trapped in the second pressure space.

3. The hydraulic device of claim 2, and further comprising means for generating a negative pressure in the second pressure space.

4. The hydraulic device of claim 1, wherein the contact surface of the primary piston and the contact surface of the secondary piston are conical.

5. The hydraulic device of claim 1, wherein the secondary piston has a first section sliding on an inner wall of the cylinder and demarcating the first pressure space on a side facing the primary piston, said secondary piston further including a second section extending in prolongation of the first section and having a diameter which is smaller than an inner diameter of the cylinder so that a third pressure space in the form of an annular gap is defined between the cylinder and the secondary piston.

6. The hydraulic device of claim 1, wherein the cylinder has a first section with a first inner diameter and a second section with a second inner diameter, wherein a region passed by the secondary piston during its movement is located within the second section, and wherein only the second section has a surface to satisfy hydraulic requirements.

7. The hydraulic device of claim 5, wherein the second section of the secondary piston partly projects beyond the cylinder.

8. The hydraulic device of claim 1, wherein the one of the piston rods of the primary piston has a first section which slides in the recess, said one piston rod further including a second section extending in prolongation of the first section and having a smaller diameter than the first section so that a fourth pressure space in the form of an annular gap is defined between the second section of the one piston rod and the secondary piston, wherein the second section is guided through a bore on a tool-side end of the recess of the secondary piston.

9. The hydraulic device of claim 1, wherein the platen is a moving platen of a three-platen clamping unit of the injection molding machine, said cylinder having an end which faces the moving platen and has an end piece which is configured as support platen of the three-platen clamping unit, said one of the piston rods being securable to the moving platen.

10. The hydraulic device of claim 1, wherein the primary piston has a side which is distal to the secondary piston and has a further piston rod defined by a diameter which is smaller than a diameter of the one piston rod, said further piston rod projecting beyond the cylinder.

11. The hydraulic device of claim 10, wherein the cylinder has an end which faces an injection molding tool and has an end piece which is configured as a platen of a two-platen clamping unit of an injection molding machine, said further piston rod being securable to another platen of the two-platen clamping unit.

12. A clamping unit for an injection molding machine, comprising:
a support platen;
a fixed platen;
a moving platen; and
a hydraulic device for operating the moving platen, said hydraulic device including a cylinder having a first pressure space with a pressure medium, a primary piston which includes one or more piston rods and is constructed to float in the pressure medium in the first pressure space, with a one of the one or more piston rods being connected to one of the platens for a half-mold of an injection molding machine, and a secondary piston axially movable in the cylinder and sized to bound the first pressure space on one side thereof in any axial disposition thereof, said secondary piston having a recess in which one of the one or more piston rods of the primary piston is movable, said primary and secondary pistons having opposing sides to define confronting contact surfaces which contact one another when the fixed and moving platens are clamped.

13. The clamping unit of claim 12, wherein the secondary piston has a first section sliding on an inner wall of the cylinder and demarcating the first pressure space on a side facing the primary piston, said secondary piston further including a second section extending in prolongation of the first section and having a diameter which is smaller than an inner diameter of the cylinder so that a further pressure space in the form of an annular gap is defined between the cylinder and the secondary piston, wherein the cylinder is secured to the support platen, or an end piece of the cylinder is configured as support platen, wherein the support platen has bores for passage of the secondary piston, wherein the platen is the moving platen, and wherein the further pressure space can be hydraulically blocked during closing and opening movements of an injection molding tool of the injection molding machine.

14. The clamping unit of claim 12, wherein the cylinder is secured to the support platen, or an end piece of the cylinder is configured as support platen, wherein the support platen has bores for passage of the secondary piston, wherein the platen is the moving platen, and further comprising at least one auxiliary cylinder provided on the support platen or the fixed platen and having a piston rod mounted to the moving platen.

15. The clamping unit of claim 14, wherein the secondary piston has a first section sliding on an inner wall of the cylinder and demarcating the first pressure space on a side facing the primary piston, said secondary piston further including a second section extending in prolongation of the first section and having a diameter which is smaller than an inner diameter of the cylinder so that a further pressure space in the form of an annular gap is defined between the cylinder and the secondary piston, said first pressure space being hydraulically blockable for the closing movement of an injection molding tool of the injection molding machine, and said further pressure space being connectable to a pressure medium source while the auxiliary cylinder is idle.

16. The clamping unit of claim 14, wherein the secondary piston has a first section sliding on an inner wall of the cylinder and demarcating the first pressure space on a side facing the primary piston, said secondary piston further including a second section extending in prolongation of the first section and having a diameter which is smaller than an inner diameter of the cylinder so that a further pressure space in the form of an annular gap is defined between the cylinder and the secondary piston, said first pressure space being hydraulically blockable for a closing movement of an injection molding tool of the injection molding machine, and wherein the auxiliary cylinder as well as the further pressure space are connectable to a pressure medium source.

17. The clamping unit of claim 14, wherein the secondary piston has a first section sliding on an inner wall of the cylinder and demarcating the first pressure space on a side facing the primary piston, said secondary piston further including a second section extending in prolongation of the first section and having a diameter which is smaller than an inner diameter of the cylinder so that a further pressure space in the form of an annular gap is defined between the cylinder and the secondary piston, wherein the auxiliary cylinder has first and second auxiliary pressure spaces and is provided on the support platen, wherein the first pressure space is hydraulically blockable for an opening movement of an injection molding tool of the injection molding machine, wherein the further pressure space as well as the first auxiliary pressure space in the auxiliary cylinder are hydraulically relieved, and the second auxiliary pressure space in the auxiliary cylinder is connectable to a pressure medium source.

18. The clamping unit of claim 14, wherein the secondary piston has a first section sliding on an inner wall of the cylinder and demarcating the first pressure space on a side facing the primary piston, said secondary piston further including a second section extending in prolongation of the first section and having a diameter which is smaller than an inner diameter of the cylinder so that a further pressure space in the form of an annular gap is defined between the cylinder and the secondary piston, wherein the auxiliary cylinder has first and second auxiliary pressure spaces and is provided on the fixed platen, wherein the first pressure space is hydraulically blockable for an opening movement of an injection molding tool of the injection molding machine, wherein the further pressure space as well as the first auxiliary pressure space in the auxiliary cylinder are hydraulically relieved, and the first auxiliary pressure space in the auxiliary cylinder is connectable to a pressure medium source.

19. A clamping unit for a two-platen injection molding machine, comprising:
   a fixed platen;
   a moving platen; and
   a hydraulic device for operating the moving platen, said hydraulic device including a cylinder having a first pressure space with a pressure medium, a primary piston which includes first and second piston rods and is constructed to float in the pressure medium in the first pressure space, with one of the first and second piston rods being connected to one of the fixed and moving platens, and a secondary piston axially movable in the cylinder and sized to bound the first pressure space on one side thereof in any axial disposition thereof, said secondary piston having a recess in which the other one of the first and second piston rods of the primary piston is movable, said primary and secondary pistons having opposing sides to define confronting contact surfaces which contact one another when the fixed and moving platens are clamped, wherein the one piston rod is defined by a diameter which is smaller than a diameter of the other piston rod.

20. The clamping unit of claim 19, wherein the cylinder is mounted to the fixed platen, or an end piece of the cylinder is configured as fixed platen, wherein the one piston rod is guided through the fixed platen and attached to the moving platen.

21. The clamping unit of claim 19, wherein the cylinder is mounted to the moving platen or an end piece of the cylinder is configured as moving platen, and wherein the one piston rod is guided through the moving platen and attached to the fixed platen.

22. The clamping unit of claim 19, wherein the recess in the secondary piston is cylindrical and has an end which is distal to the primary piston and closed by an end piece so that a pressure space is formed in the secondary piston.

23. The clamping unit of claim 22, wherein the secondary piston has a first section sliding on an inner wall of the cylinder and demarcating the first pressure space on a side facing the primary piston, said secondary piston further including a second section extending in prolongation of the first section and having a diameter which is smaller than an inner diameter of the cylinder so that a further pressure space in the form of an annular gap is defined between the cylinder and the secondary piston, wherein the further pressure space is hydraulically blockable during closing and opening movements of an injection molding tool of the injection molding machine.

24. The clamping unit of claim 22, wherein the pressure space in the secondary piston is decompressible during a closing movement of an injection molding tool and connectable to a pressure medium source for an opening movement of an injection molding tool.

25. The clamping unit of claim 19, wherein the recess in the secondary piston is cylindrical and has an end which is distal to the primary piston and open, and further comprising at least one auxiliary cylinder provided on the fixed platen or the moving platen.

26. The clamping unit of claim 25, wherein the secondary piston has a first section sliding on an inner wall of the cylinder and demarcating the first pressure space on a side facing the primary piston, said secondary piston further including a second section extending in prolongation of the first section and having a diameter which is smaller than an inner diameter of the cylinder so that a further pressure space in the form of an annular gap is defined between the cylinder and the secondary piston, wherein the first pressure space is hydraulically blockable for a closing movement of an injection molding tool, said further pressure space connectable to a pressure medium source while the auxiliary is idle.

27. The clamping unit of claim 25, wherein the secondary piston has a first section sliding on an inner wall of the cylinder and demarcating the first pressure space on a side facing the primary piston, said secondary piston further including a second section extending in prolongation of the first section and having a diameter which is smaller than an inner diameter of the cylinder so that a further pressure space in the form of an annular gap is defined between the cylinder and the secondary piston, wherein the first pressure space is hydraulically blockable for a closing movement of an injection molding tool, said auxiliary and said further pressure space connectable to a pressure medium source.

28. The clamping unit of claim 25, wherein the secondary piston has a first section sliding on an inner wall of the cylinder and demarcating the first pressure space on a side facing the primary piston, said secondary piston further including a second section extending in prolongation of the first section and having a diameter which is smaller than an inner diameter of the cylinder so that a further pressure space in the form of an annular gap is defined between the cylinder and the secondary piston, wherein the first pressure space is hydraulically blockable for an opening movement of an injection molding tool, and the further pressure space is decompressible, and wherein the auxiliary cylinder is so disposed and hydraulically actuatable that a greater surface of a piston of the auxiliary cylinder is acted upon by a pressure medium.

* * * * *